United States Patent
Zaugg et al.

(10) Patent No.: US 12,422,619 B2
(45) Date of Patent: Sep. 23, 2025

(54) FABRICATION OF WAVEGUIDE STRUCTURES

(71) Applicant: Fluxus, Inc., Sunnyvale, CA (US)

(72) Inventors: Frank Zaugg, Redwood City, CA (US); Joshua Wayne Parks, Portland, OR (US)

(73) Assignee: Fluxus, Inc., Sunnyvale, CA (US)

( * ) Notice: Subject to any disclaimer, the term of this patent is extended or adjusted under 35 U.S.C. 154(b) by 0 days.

(21) Appl. No.: 18/510,137

(22) Filed: Nov. 15, 2023

(65) Prior Publication Data
US 2024/0085629 A1    Mar. 14, 2024

Related U.S. Application Data

(63) Continuation of application No. 17/970,804, filed on Oct. 21, 2022, now Pat. No. 11,852,869, which is a (Continued)

(51) Int. Cl.
C03C 15/00 (2006.01)
G02B 6/122 (2006.01)
G02B 6/136 (2006.01)

(52) U.S. Cl.
CPC .............. *G02B 6/136* (2013.01); *C03C 15/00* (2013.01); *G02B 6/122* (2013.01)

(58) Field of Classification Search
None
See application file for complete search history.

(56) References Cited

U.S. PATENT DOCUMENTS 6,063,299 A    5/2000  Drake et al.
6,253,015 B1   6/2001  Ukrainczyk
(Continued)

FOREIGN PATENT DOCUMENTS

CN       1729415 A      1/2006
JP    2004-512551 A     4/2004
(Continued)

OTHER PUBLICATIONS

Chen et al. (2006). "Development of ion-implanted optical waveguides in optical materials: A review," Optical Materials 29; 1523-1542.
(Continued)

*Primary Examiner* — Shamim Ahmed
(74) *Attorney, Agent, or Firm* — Morrison & Foerster LLP

(57) ABSTRACT

A method of fabricating a waveguide structure to form a solid-core waveguide from a waveguiding layer may include etching a fluid channel into the waveguiding layer, etching a first air-gap and a second air gap into the waveguiding layer, wherein etching the first and the second air-gaps creates a solid-core waveguide in the waveguiding layer between the first air-gap and the second air-gap. A method for fabricating a waveguide structure to form a solid-core waveguide may include forming a first trench, a second trench, and a third trench in a substrate layer, and depositing a waveguiding layer on the machined substrate layer, wherein depositing the waveguiding layer creates a hollow core of a fluid channel in a location corresponding to the first trench, and a solid-core waveguide portion in the waveguiding layer in a location corresponding to an area between the second trench and the third trench.

22 Claims, 19 Drawing Sheets

Related U.S. Application Data continuation of application No. 17/057,508, filed as application No. PCT/US2019/033365 on May 21, 2019, now Pat. No. 11,480,733.

(60) Provisional application No. 62/674,853, filed on May 22, 2018.

(56) References Cited

U.S. PATENT DOCUMENTS

| | | | |
|---|---|---|---|
| 6,438,279 | B1 | 8/2002 | Craighead et al. |
| 6,946,238 | B2 | 9/2005 | Zhang et al. |
| 9,551,650 | B2 | 1/2017 | Nitkowski et al. |
| 9,835,801 | B1 | 12/2017 | Qian et al. |
| 2003/0006140 | A1 | 1/2003 | Vacca et al. |
| 2003/0012483 | A1 | 1/2003 | Ticknor et al. |
| 2003/0117699 | A1 | 6/2003 | Maroney et al. |
| 2003/0219192 | A1 | 11/2003 | Crafts et al. |
| 2006/0098927 | A1* | 5/2006 | Schmidt ............... G01N 21/645 385/129 |
| 2006/0251371 | A1 | 11/2006 | Schmidt et al. |
| 2008/0152280 | A1 | 6/2008 | Lundquist et al. |
| 2012/0293797 | A1 | 11/2012 | Braeckmans et al. |
| 2013/0223790 | A1 | 8/2013 | Jones et al. |
| 2013/0244227 | A1 | 9/2013 | Schmidt et al. |
| 2015/0093816 | A1 | 4/2015 | Lagae et al. |
| 2016/0003730 | A1 | 1/2016 | Schreuder et al. |
| 2017/0205351 | A1 | 7/2017 | Astier et al. |
| 2017/0227465 | A1 | 8/2017 | Hsieh et al. |
| 2018/0081207 | A1 | 3/2018 | Qian et al. |
| 2019/0064421 | A1 | 2/2019 | Grot et al. |
| 2019/0309361 | A1 | 10/2019 | Mccaffrey et al. |
| 2020/0200972 | A1 | 6/2020 | Steglich et al. |
| 2023/0131829 | A1* | 4/2023 | Parks .................. G01N 21/645 385/14 |
| 2024/0118490 | A1 | 4/2024 | Zaugg |

FOREIGN PATENT DOCUMENTS

| | | |
|---|---|---|
| JP | 2014-504154 A | 12/2014 |
| WO | 02/33457 A2 | 4/2002 |
| WO | 2004/040319 A1 | 5/2004 |
| WO | 2011/073410 A1 | 6/2011 |
| WO | 2012/068511 A2 | 5/2012 |
| WO | 2019/226679 A1 | 11/2019 |

OTHER PUBLICATIONS

Extended European Search Report dated Jan. 28, 2022, directed to EP Application No. 19806437.0; 8 pages.

International Preliminary Report on Patentability mailed Dec. 3, 2020, directed to International Application No. PCT/US2019/033365; 8 pages.

International Search Report and Written Opinion dated May 23, 2023, directed to International Application No. PCT/US2022/077814; 17 pages.

International Search Report and Written Opinion mailed Aug. 9, 2019, directed to International Application No. PCT/US2019/33365; 10 pages.

Messaddeq (Spring 2015). "Glass Processing," Lehigh Lecture 19 Introduction to Dielectric Waveguide; 68 pages.

Notice of Reason for Rejection dated Feb. 7, 2023, directed to JP Application No. 2021-516527; 12 pages.

Notification of the First Office Action dated Jul. 15, 2022, directed to CN Application No. 201980033689.9; 16 pages.

Office Action dated Jan. 13, 2023, directed to CN Application No. 201980033689.9; 9 pages.

Office Action dated Sep. 9, 2022, directed to IN Application No. 202017051590; 6 pages.

Pena-Rodriguez et al. (2012). "Optical Waveguides Fabricated by Ion Implantation/Irradiation: A Review," Ion Implantation; 48 pages.

Righini et al. (Jul. 2014). "Glass optical waveguides: a review of fabrication techniques," Optical Engineering 53(7); 15 pages.

Song et al., (1999). "Micromachined Silicon Optical Bench for the Low Cost Optical Module," LG Corporate Institute of Technology; 9 pages.

Zaugg et al., U.S. Notice of Allowance dated Aug. 11, 2023, directed to U.S. Appl. No. 17/970,804; 9 pages.

Zaugg et al., U.S. Office Action dated Jan. 6, 2022, directed to U.S. Appl. No. 17/057,508; 14 pages.

Zhao et al., (2012). "Optimizatiion of Interface Transmission Between Integrated Solid Core and Optofluidic Waveguides," IEEE Photonics Tech. Letters 24: 1, pp. 46-48.

Notice of Reasons for Rejection dated Mar. 26, 2024, directed to JP Application No. 2021-516527; 9 pages.

Office Action dated May 15, 2024, directed to CA Application No. 3,098,629; 5 pages.

Office Action dated Jul. 9, 2024, directed to KR Application No. 10-2020-7036889; 13 pages.

Zaugg et al., U.S. Office Action dated Jul. 31, 2024, directed to U.S. Appl. No. 17/962,204; 9 pages.

Notice of Reasons for Rejection dated Oct. 17, 2023, directed to JP Application No. 2021-516527; 11 pages.

Office Action dated Jan. 15, 2024, directed to EP Application No. 19806437.0; 8 pages.

International Search Report and Written Opinion dated Sep. 9, 2021 directed to International Application No. PCT/US2021/028234; 25 pages.

Invitation to Pay Additional Fees mailed Jul. 14, 2021, directed to International Application No. PCT/US2021/028234; 23 pages.

Parks et al.; "Hybrid optofluidic integration"; Lab on a Chip; vol. 13; 2013; p. 4118-4123.

Restriction Requirement dated Jan. 29, 2025, directed to U.S. Appl. No. 17/918,039; 8 pages.

Stotts et al. "Silicate Overcoat Layers for the Improvement of PECVD SiO2 Optofluidic Waveguides," IEEE 58th International Midwest Symposium on Circuits and Systems, Aug. 2-5, 2015, Fort Collins, CO, USA; 4 pages.

* cited by examiner

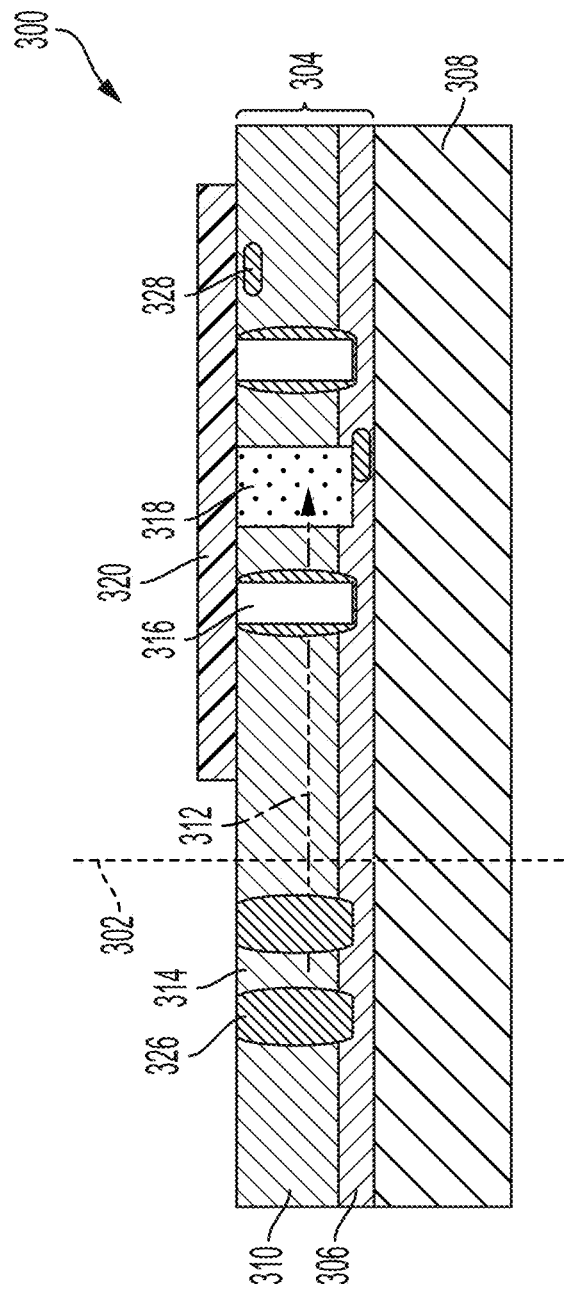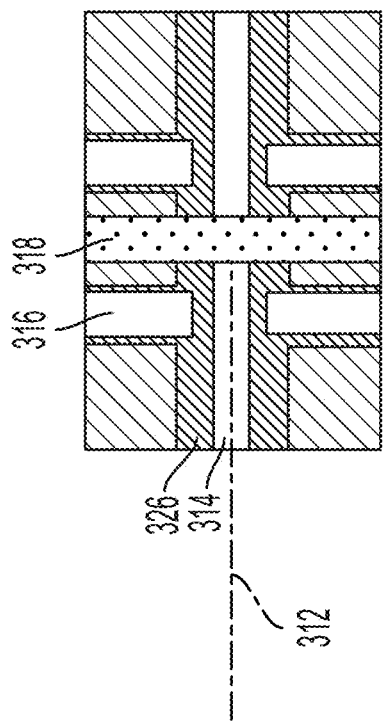
FIG. 3A
FIG. 3B

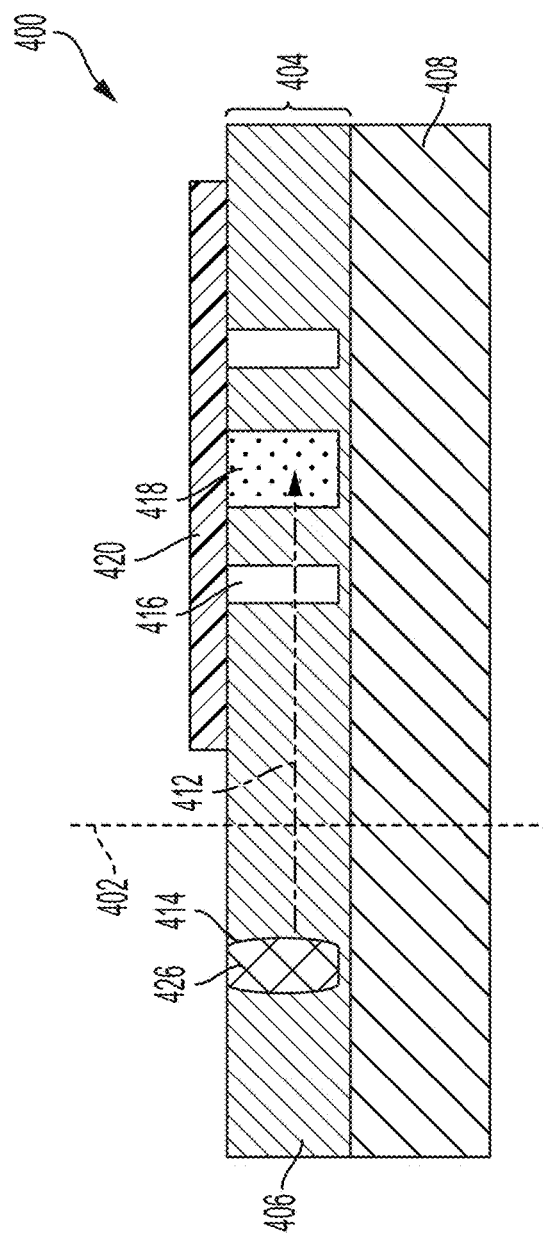
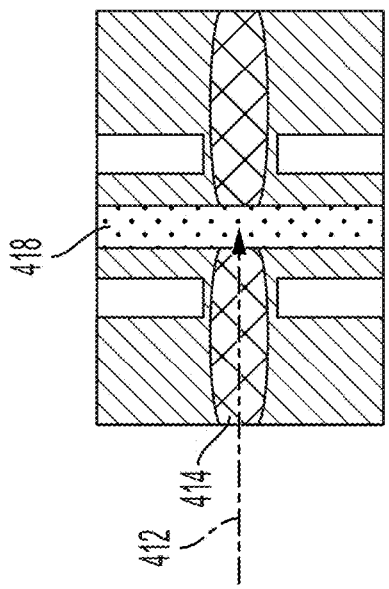
FIG. 4A
FIG. 4B

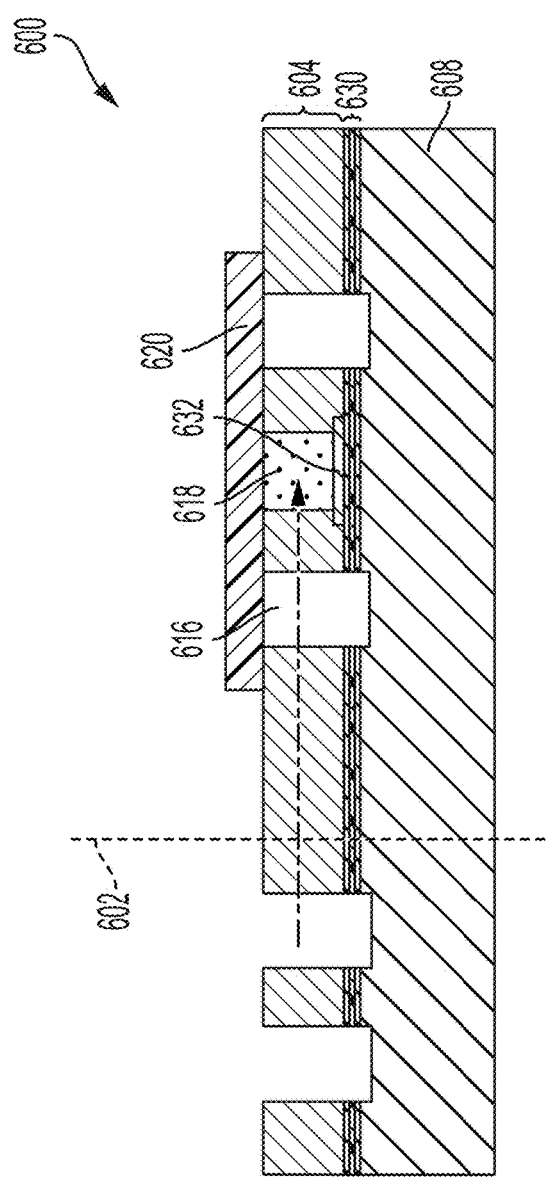
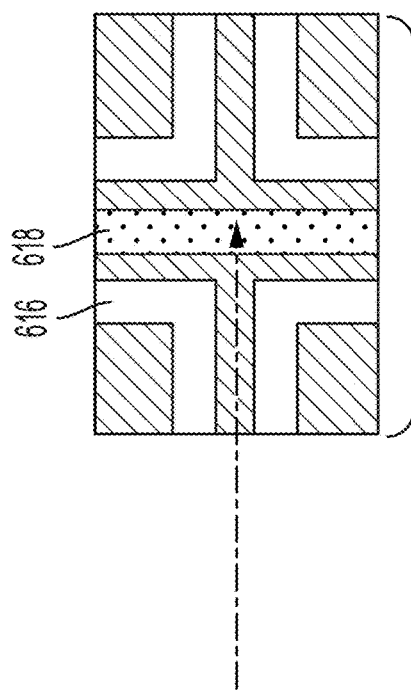
FIG. 6A
FIG. 6B

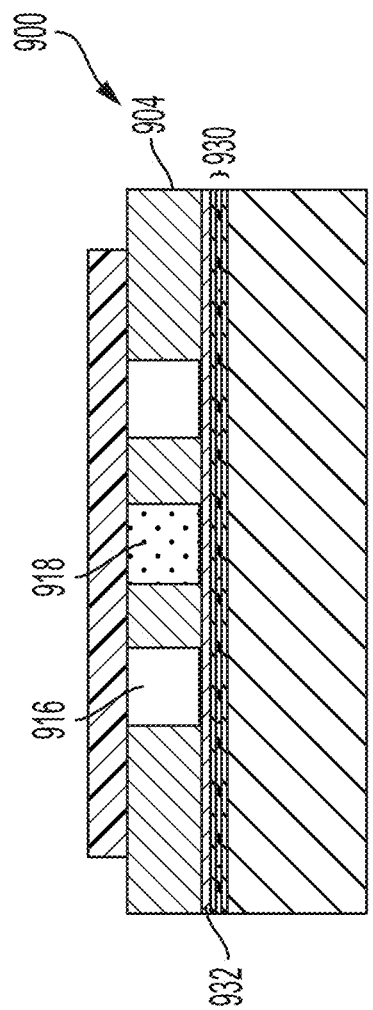
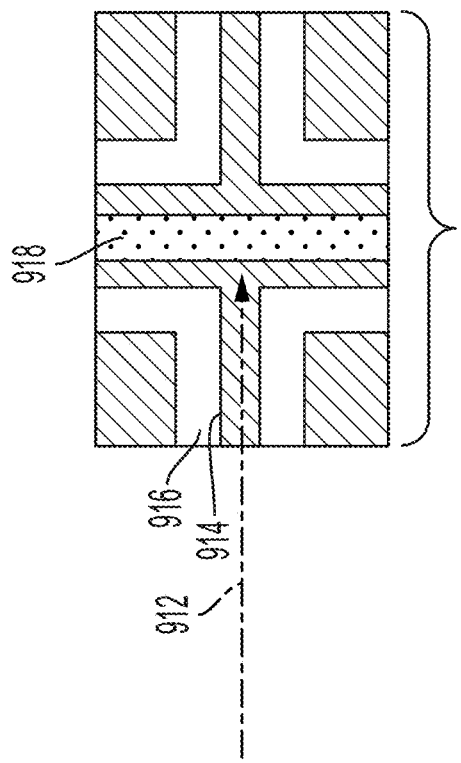

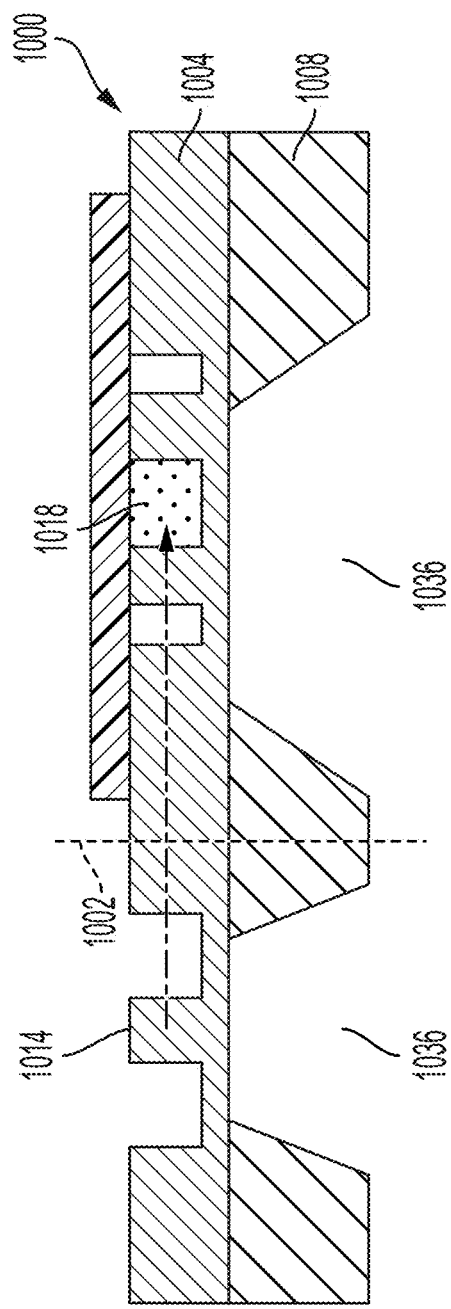
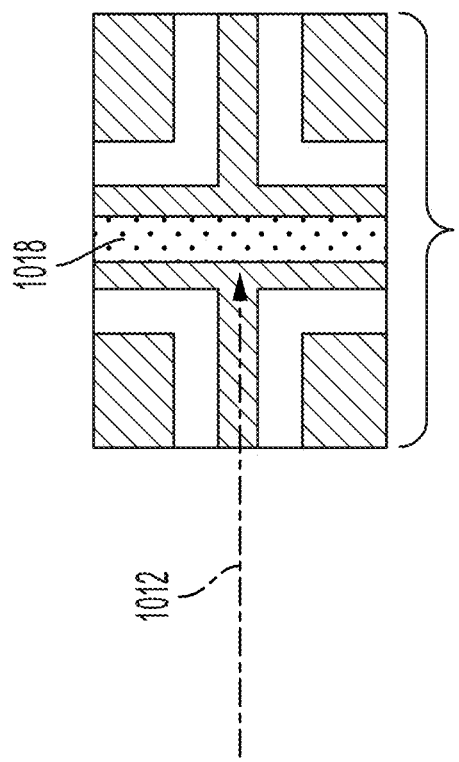

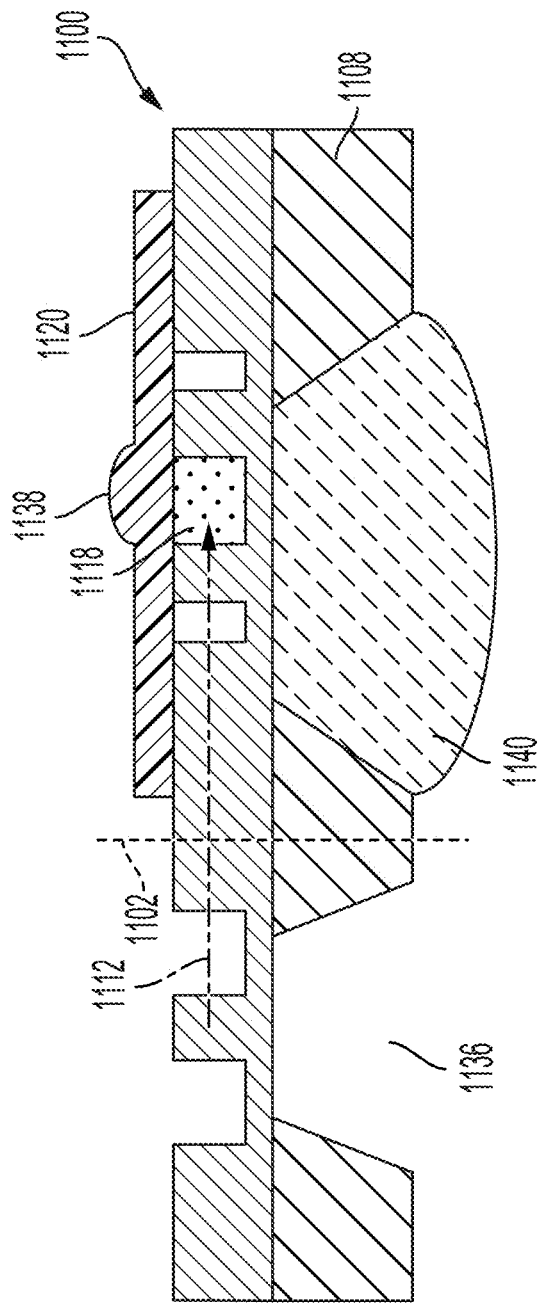
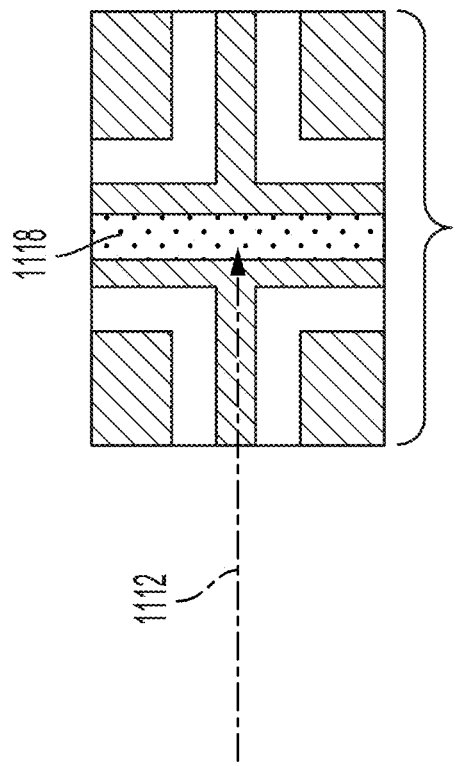
FIG. 11A
FIG. 11B

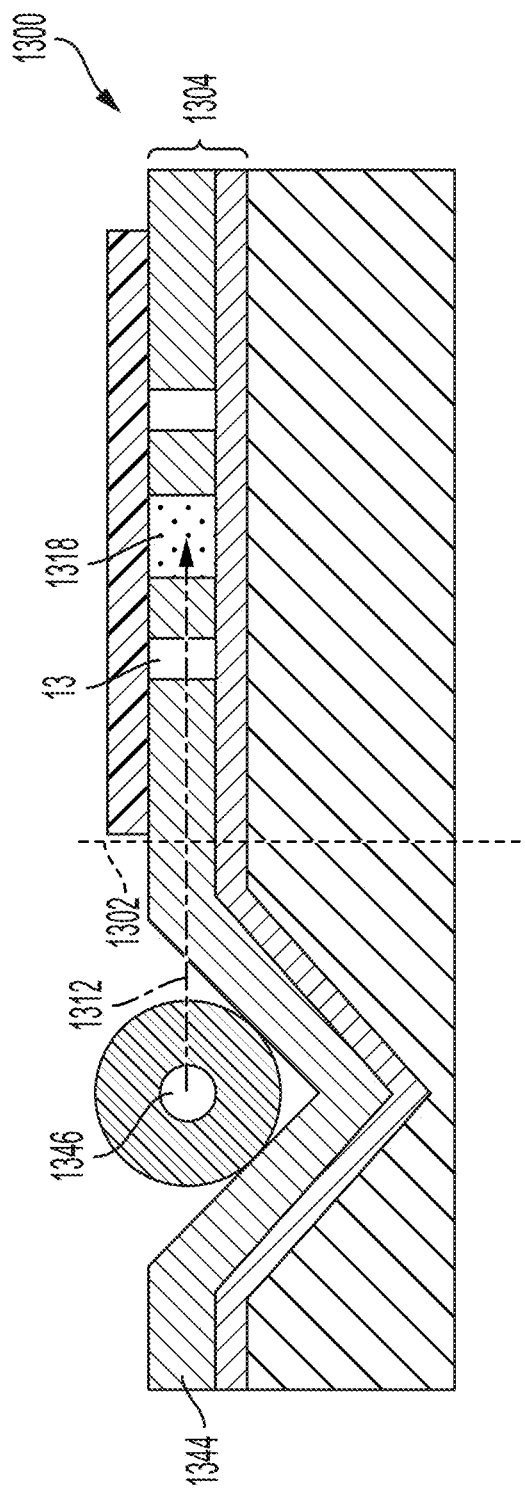
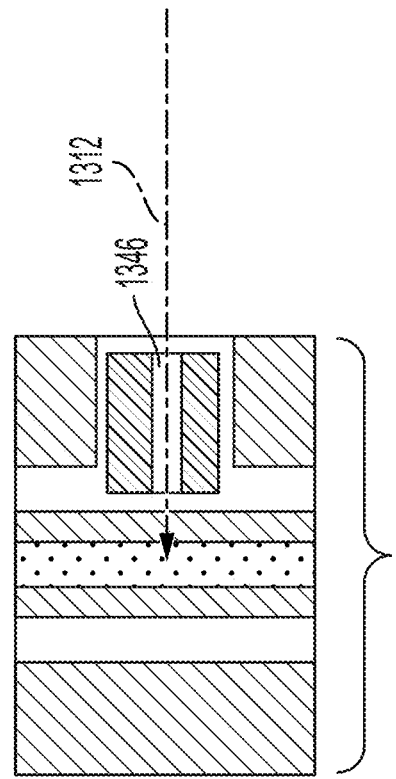
FIG. 13A
FIG. 13B

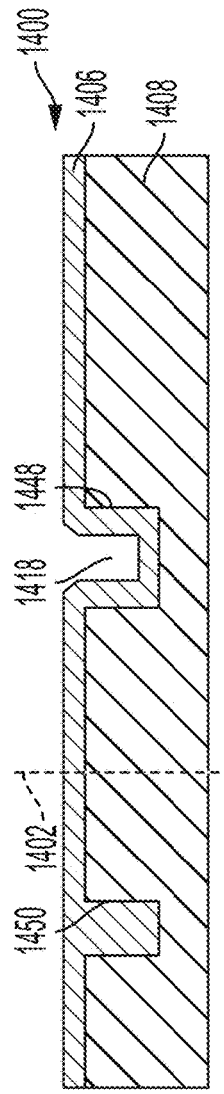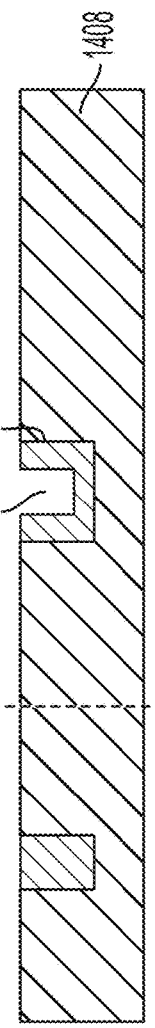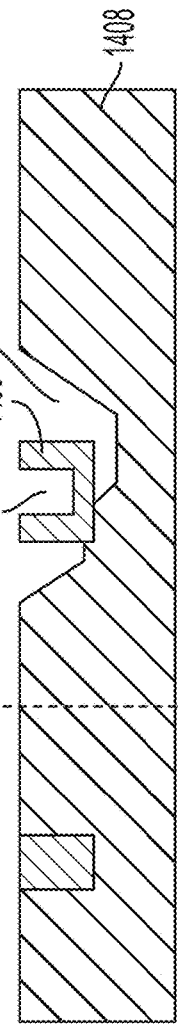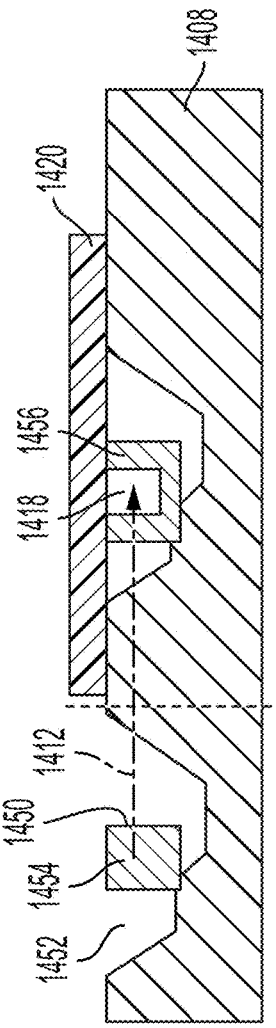

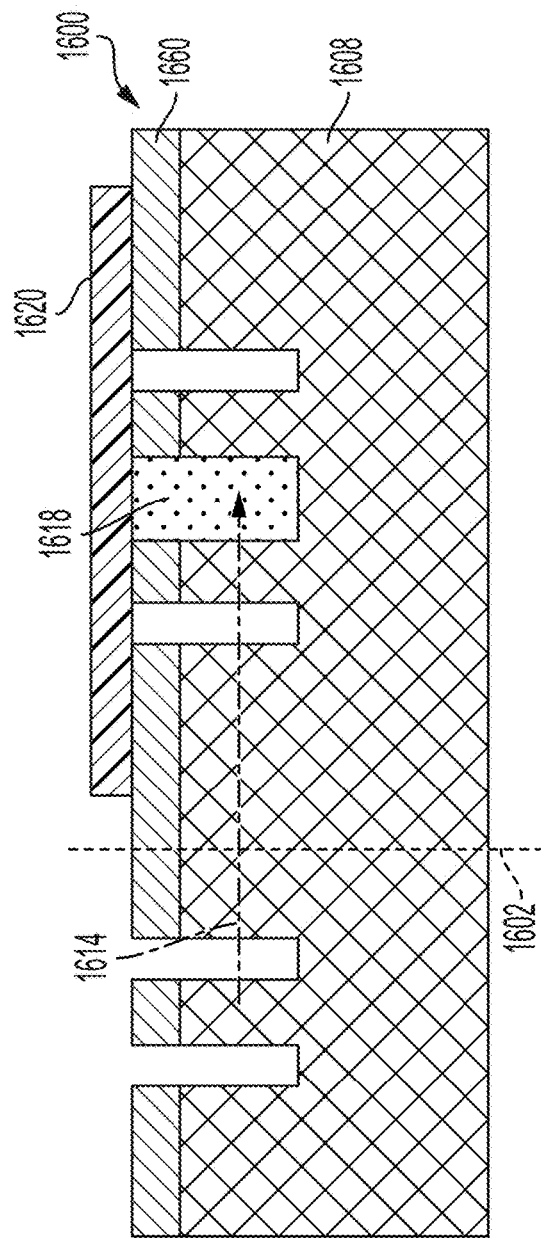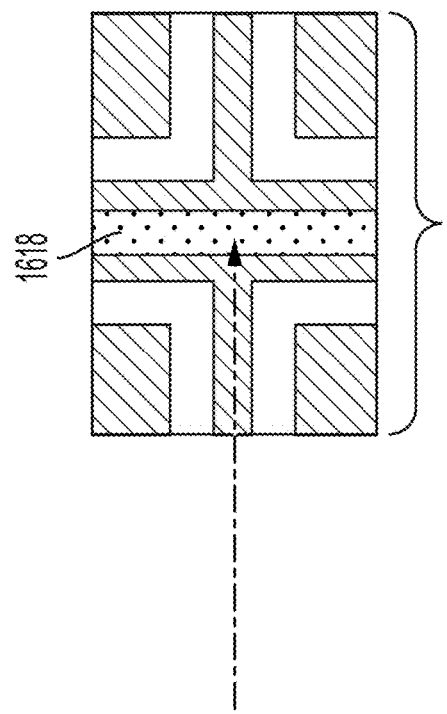

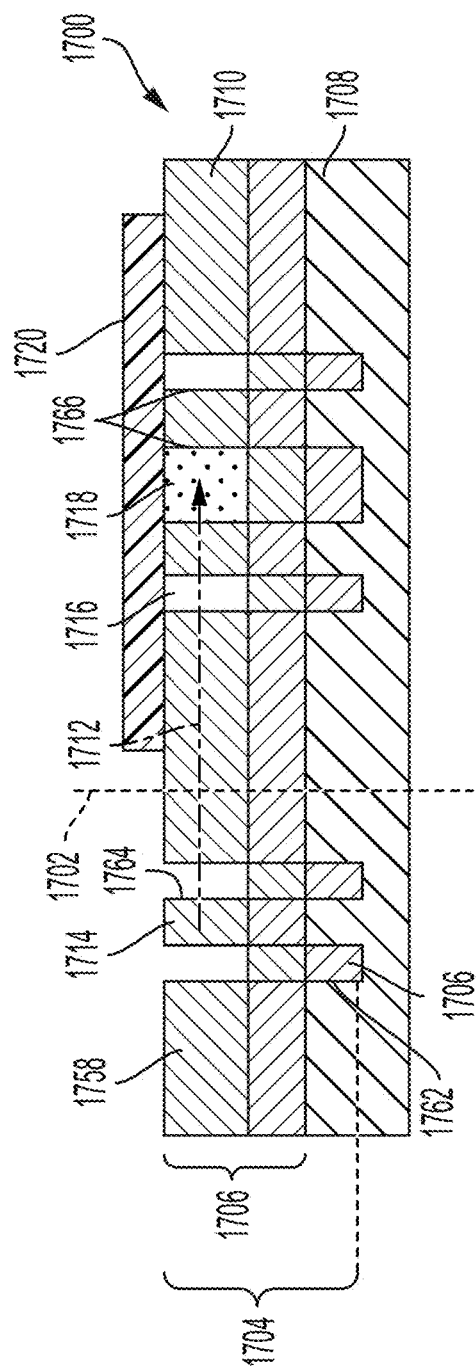
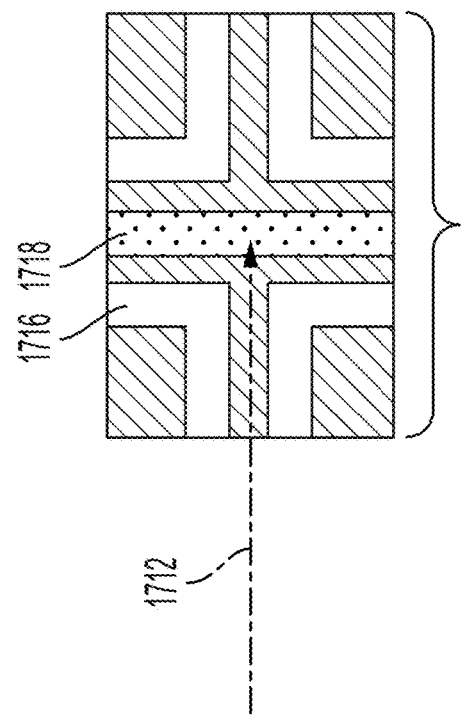
FIG. 17A
FIG. 17B

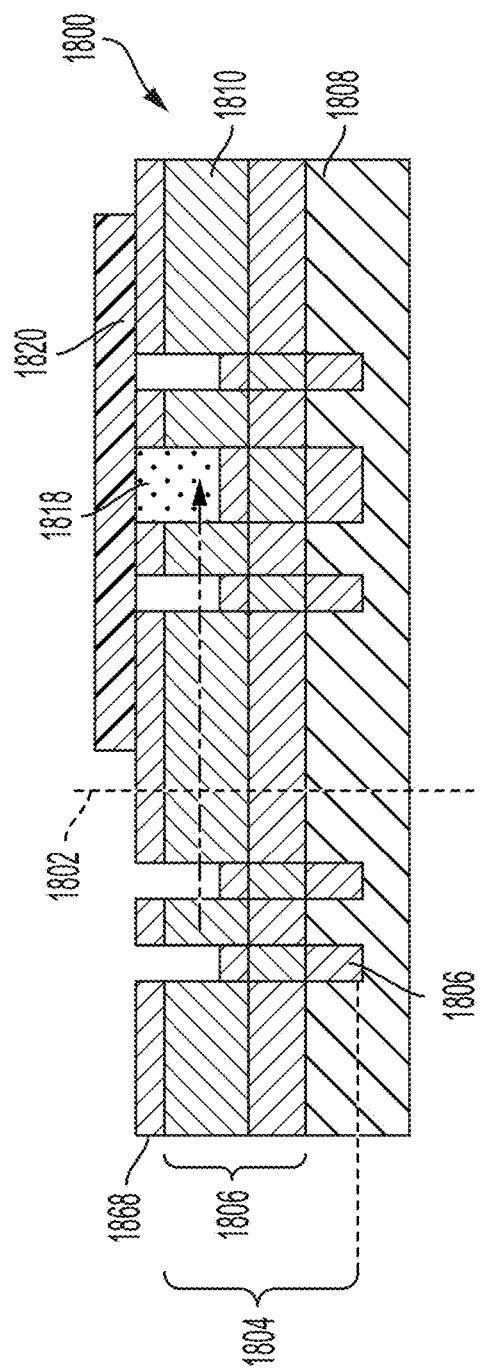
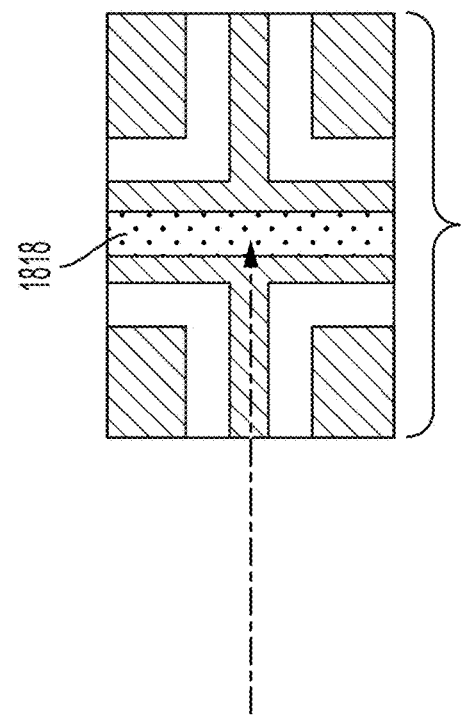
FIG. 18A
FIG. 18B

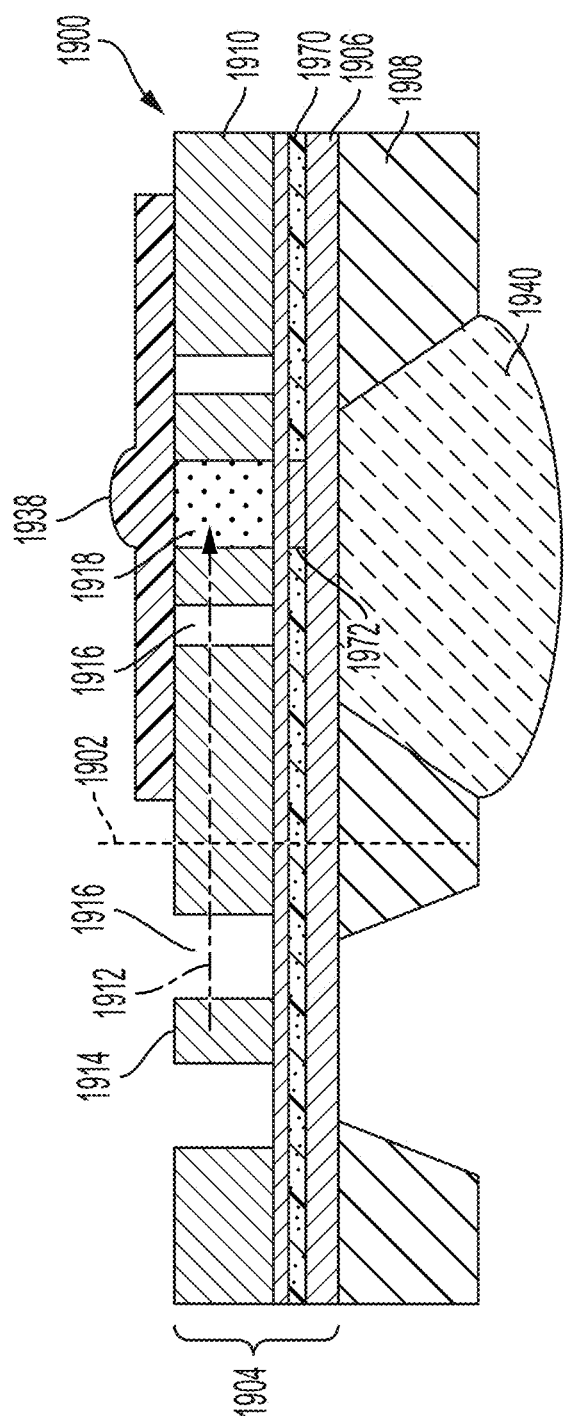
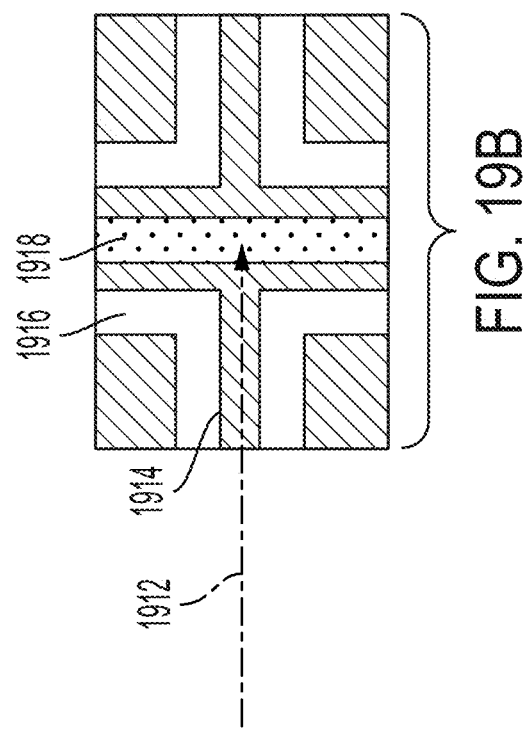
FIG. 19A
FIG. 19B

FABRICATION OF WAVEGUIDE STRUCTURES

CROSS REFERENCE TO RELATED APPLICATIONS

This application is a continuation of U.S. patent application Ser. No. 17/970,804, filed Oct. 21, 2022, now U.S. Pat. No. 11,852,869, issued Dec. 26, 2023, which is a continuation of U.S. patent application Ser. No. 17/057,508, filed Nov. 20, 2020, now U.S. U.S. Pat. No. 11,480,733, issued on Oct. 25, 2022, which is a national stage application under 35 U.S.C. 371 of International Application No. PCT/US2019/033365, filed May 21, 2019, which claims the benefit of U.S. Provisional Application No. 62/674,853, filed May 22, 2018. The entire contents of each priority application is incorporated herein by reference.

TECHNICAL FIELD

The present disclosure relates generally to methods for fabrication of waveguides, and more particularly to methods for fabrication of two-dimensional waveguide structures such as optofluidic chips having solid-core waveguides, fluid-core channels, and/or fluid-core waveguides.

BACKGROUND

Waveguide structures such as optical chips and optofluidic chips are critical in modern biomedical research. These waveguide structures may comprise solid-core waveguides, fluidic channels, and/or fluid-core waveguides, which may be disposed in the same plane as one another and may intersect one another in various configurations.

Known techniques for fabricating said structures require multiple fabrication steps. For example, known techniques for fabrication of waveguide chips may include six or more lithography steps, multiple etching steps, multiple deposition steps, and a sacrificial core removal process.

SUMMARY

As described above, known techniques for fabricating waveguide structures such as optical chips and optofluidic chips require a multitude of steps. These various steps are difficult, complex, time-consuming, and expensive to perform. For example, alignment steps introduce various opportunities for imperfections and flaws in waveguide structures due to misalignment. Furthermore, sacrificial core removal processes may be extremely time-consuming. Furthermore, there is a need in fields leveraging biosensor chips and waveguide structures to develop optimized chip and waveguide architectures, including by reducing the number of steps and processes for fabricating said optimized chips and structures in order to improve general manufacturability, cost, yield, and reproducibility. Accordingly, there is a need for improved techniques for fabrication of waveguide structures including optical chips and optofluidic chips that are simpler, less difficult, less time-consuming, and less expensive than known techniques.

Disclosed herein are improved techniques that may address one or more of the above needs. In some embodiments, as described herein, a single lithography/etching process followed by a bonding process may replace the unwieldy and expansive series of steps required by previous techniques. The reduction in the overall number of steps may allow for faster, more efficient, less complex, and less expensive production (e.g., manufacturability, cost, yield, reproducibility), including at a commercial scale. The elimination of alignment steps may further improve quality control by preventing misalignment and imperfections that may be created during traditional alignment procedures. For example, these techniques may enable automatic alignment and waveguide intersections that have far fewer imperfections than those formed by conformal coatings and etchings. Furthermore, the techniques described herein may require fewer microfabrication steps than known methods, may create an automatic alignment of a solid-core waveguide to a fluid-core channel (instead of one mask for each), may create a monolithic intersection between solid cores and fluid cores, may allow direct fluidic integration (e.g., a planar chip surface may enable bonding techniques as well as simpler fluidic interconnects), may eliminate the requirement for time-consuming sacrificial core removal, and may enable choosing between more varied materials than only those materials that are compatible with traditional methods.

In some embodiments, a first method for fabricating a waveguide structure to form at least one solid-core waveguide from a waveguiding layer is provided, the first method comprising: etching a fluid channel into the waveguiding layer; etching a first air-gap and a second air gap into the waveguiding layer; wherein etching the first and the second air-gaps creates a solid-core waveguide in the waveguiding layer between the first air-gap and the second air-gap; and affixing a cover layer to the waveguiding layer to enclose the fluid channel.

In some embodiments of the first method, the waveguiding layer comprises a first oxide layer and a second oxide layer, wherein the first oxide layer is to a first side of the second oxide layer and has a first index of refraction, and the second oxide layer has a second index of refraction lower than the first index of refraction.

In some embodiments of the first method: etching the fluid channel comprises etching into the second oxide layer and the first oxide layer at once; etching the first air gap comprises etching into the second oxide layer and the first oxide layer at once; and etching the second air gap comprises etching into the second oxide layer and the first oxide layer at once.

In some embodiments of the first method: the waveguiding layer further comprises a third oxide layer to a second side, opposite the first side, of the second oxide layer, wherein the third oxide layer has a third index of refraction lower than the first index of refraction, and etching the fluid channel comprises etching into the third, second, and first oxide layers at once; etching the first air gap comprises etching into the third, second, and first oxide layers at once; and etching the second air gap comprises etching into the third, second, and first oxide layers at once.

In some embodiments of the first method, the first method further comprises doping the waveguiding layer to create one or more doped regions in the waveguiding layer having a doped index of refraction lower than a surrounding index of refraction, wherein the one or more doped regions are adjacent to the solid-core waveguide.

In some embodiments of the first method, the one or more doped regions are adjacent to the first air-gap and the second air-gap.

In some embodiments of the first method, the one or more doped regions are adjacent to the fluid channel.

In some embodiments of the first method, the first method further comprises doping the waveguiding layer to create one or more doped regions in the waveguiding layer having a doped index of refraction higher than a surrounding index of refraction, wherein the one or more doped regions form the solid-core waveguide.

In some embodiments of the first method: the waveguide structure comprises an ARROW layer; etching the fluid channel comprises etching into the waveguiding layer without etching into the ARROW layer; etching the first air gap comprises etching into the waveguiding layer without etching into the ARROW layer; and etching the second air gap comprises etching into the waveguiding layer without etching into the ARROW layer.

In some embodiments of the first method: the waveguide structure comprises an ARROW layer; the waveguide structure comprises an etch-stop layer between the ARROW layer and the waveguiding layer at a location corresponding to the fluid channel; etching the fluid channel comprises: etching into the waveguiding layer without etching into the ARROW layer; dissolving the etch-stop layer; etching the first air gap comprises etching into the waveguiding layer and the ARROW layer at once; and etching the second air gap comprises etching into the waveguiding layer and the ARROW layer at once.

In some embodiments of the first method: the waveguide structure comprises an ARROW layer; etching the fluid channel comprises performing dry etching followed performing wet etching; etching the first air gap comprises performing dry etching followed performing wet etching; and etching the first air gap comprises performing dry etching followed performing wet etching.

In some embodiments of the first method: the waveguide structure comprises an ARROW layer; etching the fluid channel comprises etching partially into the waveguiding layer without etching through the waveguiding layer to the ARROW layer; etching the first air gap comprises etching into the waveguiding layer and the ARROW layer at once; and etching the second air gap comprises etching into the waveguiding layer and the ARROW layer at once.

In some embodiments of the first method: etching the first air gap comprises etching into the waveguiding layer, the ARROW layer, and the substrate layer at once; etching the second air gap comprises etching into the waveguiding layer, the ARROW layer, and the substrate layer at once.

In some embodiments of the first method: the waveguide structure comprises an ARROW layer below the waveguiding layer; the waveguide structure comprises an etch-stop layer between the ARROW layer and the waveguiding layer extending to a location corresponding the fluid channel, a location corresponding to the first air-gap, and a location corresponding to the second air-gap; etching the fluid channel comprises etching into the waveguiding layer without etching into the ARROW layer; etching the first air gap comprises etching into the waveguiding layer without etching into the ARROW layer; etching the second air gap comprises etching into the waveguiding layer without etching into the ARROW layer; and the first method further comprises dissolving the etch-stop layer.

In some embodiments of the first method: the waveguide structure comprises a substrate layer coupled to the waveguiding layer; the method further comprises etching into the substrate to create a third air-gap adjacent to one or more of the fluidic channel and the solid-core waveguide, wherein the third air gap is configured to cause internal reflection of light propagating in one or more of the fluidic channel and the solid-core waveguide.

In some embodiments of the first method, the first method further comprises disposing a lens element in the third air-gap, wherein the lens element is configured to collect light that escapes from the fluidic channel into the third air-gap.

In some embodiments of the first method, etching into the substrate to create the third air-gap comprises undercutting one or more of the fluidic channel and the solid-core waveguide.

In some embodiments of the first method, the waveguide structure comprises a microfabricated fiber alignment feature.

In some embodiments of the first method, the first method further comprises doping the waveguiding layer from a surface of the waveguiding layer upon which etching is performed to cause the waveguiding layer to have a gradient index of refraction that is highest near the doped surface.

In some embodiments of the first method, the first method further comprises, after doping the waveguiding layer and before etching into the waveguiding layer, disposing a protective layer on the waveguiding layer, wherein affixing the cover layer to the waveguiding layer comprises affixing the cover layer to the protective layer.

In some embodiments of the first method: etching the fluid channel comprises performing dry etching; etching the first air gap comprises performing dry etching; and etching the second air gap comprises performing dry etching.

In some embodiments of the first method, the first method further comprises etching into the waveguiding layer behind an end of the solid-core waveguide, thereby forming an end of the solid-core waveguide.

In some embodiments, a first waveguide structure is provided, the first waveguide structure comprising: a waveguiding layer comprising a fluid channel, a first air gap, and a second air gap; wherein the first and the second air gaps define a solid-core waveguide in the waveguiding layer between the first air-gap and the second air-gap; and a cover layer affixed to the waveguiding layer to enclose the fluid channel.

In some embodiments of the first waveguide structure, the waveguiding layer comprises a first oxide layer and a second oxide layer, wherein the first oxide layer is to a first side of the second oxide layer and has a first index of refraction, and the second oxide layer has a second index of refraction lower than the first index of refraction.

In some embodiments of the first waveguide structure, one or more of the fluid channel, first air gap, and second air gap extends at least partially through the first oxide layer and the second oxide layer.

In some embodiments of the first waveguide structure: the waveguiding layer further comprises a third oxide layer to a second side, opposite the first side, of the second oxide layer, wherein the third oxide layer has a third index of refraction lower than the first index of refraction; and one or more of the fluid channel, first air gap, and second air gap extends at least partially through the first oxide layer, the second oxide layer, and the third oxide layer.

In some embodiments of the first waveguide structure, the waveguiding layer comprises one or more doped regions having a doped index of refraction lower than a surrounding index of refraction, wherein the one or more doped regions are adjacent to the solid-core waveguide.

In some embodiments of the first waveguide structure, the one or more doped regions are adjacent to the first air-gap and the second air-gap.

In some embodiments of the first waveguide structure, the one or more doped regions are adjacent to the fluid channel.

In some embodiments of the first waveguide structure, the waveguiding layer comprises one or more doped regions having a doped index of refraction higher than a surrounding index of refraction, wherein the one or more doped regions form the solid-core waveguide.

In some embodiments of the first waveguide structure, the first waveguide structure further comprises: an ARROW layer; wherein one or more of the fluid channel, first air gap, and second air gap extends at least partially through the waveguiding layer without extending into the ARROW layer.

In some embodiments of the first waveguide structure, the first waveguide structure further comprises: an ARROW layer; and wherein the fluid channel extends at least partially through the waveguiding layer without extending into the ARROW layer; and wherein one or more of the first air gap and second air gap extends at least partially through the waveguiding layer and the ARROW layer.

In some embodiments of the first waveguide structure, the first waveguide structure further comprises a substrate layer coupled to the waveguiding layer.

In some embodiments of the first waveguide structure, the substrate layer comprises a third air gap adjacent to one or more of the fluidic channel and the solid-core waveguide, wherein the third air gap is configured to cause internal reflection of light propagating in one or more of the fluidic channel and the solid-core waveguide.

In some embodiments of the first waveguide structure, the third air gap comprises a lens element configured to collect light that escapes from the fluidic channel into the third air-gap.

In some embodiments of the first waveguide structure, the third air gap undercuts one or more of the fluidic channel and the solid-core waveguide.

In some embodiments of the first waveguide structure, the first waveguide structure further comprises a microfabricated fiber alignment feature.

In some embodiments of the first waveguide structure, the waveguiding layer has a gradient index of refraction.

In some embodiments of the first waveguide structure, the first waveguide structure further comprises a protective layer disposed on the waveguiding layer, wherein one or more of the fluid channel, first air gap, and second air gap extends at least partially through the protective layer and the waveguiding layer.

In some embodiments, a second method for fabricating a waveguide structure to form at least one solid-core waveguide is provided, the second method comprising: forming a first trench, a second trench, and a third trench in a substrate layer; forming an oxide layer from the machined substrate layer by oxidizing the machined substrate layer; doping the oxide layer to create one or more doped regions having a doped index of refraction higher than an original index of refraction of the oxide layer, wherein doping the oxide layer creates: a hollow core of a fluid channel in a location corresponding to the first trench; and a solid-core waveguide portion in the waveguiding layer in a location corresponding to an area between the second trench and the third trench; and affixing a cover layer to the doped oxide layer to enclose the fluid channel.

In some embodiments of the second method, the second method further comprises, before affixing the cover layer, depositing a second oxide layer on the doped oxide layer.

In some embodiments of the second method, forming one or more of the first trench, the second trench, and the third trench in the substrate layer comprises machining the one or more trenches into the substrate layer.

In some embodiments of the second method, the substrate layer comprises silicon.

In some embodiments, a second waveguide structure is provided, the second waveguide structure made by a method comprising: etching a fluid channel into a waveguiding layer of the waveguide structure; etching a first air-gap and a second air gap into the waveguiding layer; wherein etching the first and the second air-gaps creates a solid-core waveguide in the waveguiding layer between the first air-gap and the second air-gap; and affixing a cover layer to the waveguiding layer to enclose the fluid channel.

In some embodiments, any one or more of the features of any one or more of the embodiments set forth above may be combined with one another, and/or with other features or aspects of any method, system, technique, or device disclosed herein.

BRIEF DESCRIPTION OF THE DRAWINGS

FIGS. 3A and 3B depict two schematic views of a waveguide structure comprising low-index doping regions defining one or more waveguides, in accordance with some embodiments.

FIGS. 4A and 4B depict two schematic views of a waveguide structure comprising high-index doping regions defining one a waveguide, in accordance with some embodiments.

FIGS. 6A and 6B depict two schematic views of a waveguide structure comprising ARROW layers and an etch-stop layer, in accordance with some embodiments.

FIGS. 9A and 9B depict two schematic views of a waveguide structure comprising anti-resonant reflecting optical waveguide (ARROW) layers and an etch-stop layer located underneath multiple trenches, in accordance with some embodiments.

FIGS. 10A and 10B depict two schematic views of a waveguide structure comprising air-gaps formed in a substrate layer, in accordance with some embodiments.

FIGS. 11A and 11B depict two schematic views of a waveguide structure comprising air-gaps formed in a substrate layer and comprising lenses for light collection, in accordance with some embodiments.

FIGS. 13A and 13B depict two schematic views of a waveguide structure comprising a fiber alignment feature, in accordance with some embodiments.

FIGS. 14A-D depict four schematic views of a waveguide structure during various stages of a CMP-based trench fabrication method, in accordance with some embodiments.

FIGS. 16A and 16B depict two schematic views of a waveguide structure comprising a doped oxide substrate and a capping layer beneath a bonded cover layer, in accordance with some embodiments.

FIGS. 17A and 17B depict two schematic views of a waveguide structure formed by oxidizing and doping a machined substrate layer to form a waveguiding layer, in accordance with some embodiments.

FIGS. 18A and 18B depict two schematic views of a waveguide structure formed by oxidizing and doping a machined substrate layer to form a waveguiding layer, in accordance with some embodiments.

FIGS. 19A and 19B depict two schematic views of a waveguide structure comprising air-gaps formed in a substrate layer and comprising lenses for light collection and comprising an aperture layer, in accordance with some embodiments.

DETAILED DESCRIPTION OF ILLUSTRATIVE EMBODIMENTS

Figure 1A:
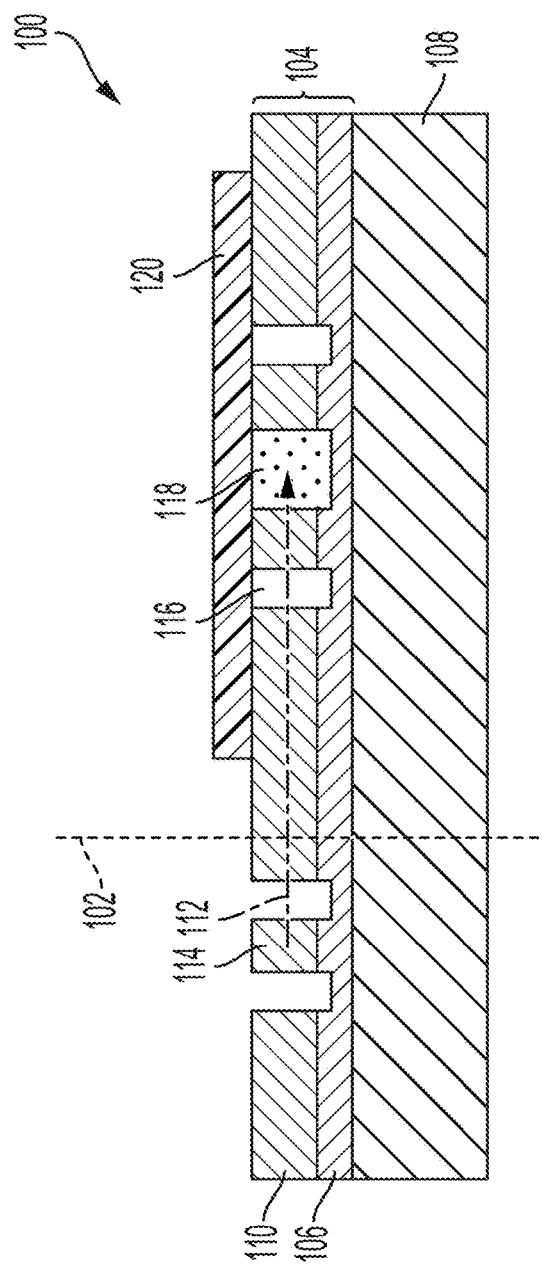
FIGS. 1A and 1B depict two schematic views of a waveguide structure, in accordance with some embodiments.

In some embodiments, as described herein, a single lithography/etching process followed by a bonding process may replace the unwieldy and expansive series of steps required by previous techniques. For example, a waveguide structure (e.g., a two-dimensional waveguide structure) may be formed from a chip comprising a substrate layer and a waveguiding layer on top of the substrate layer. In some embodiments, the substrate layer may be formed of silicon or other suitable materials and the waveguiding layer may be formed of one or more oxides, such as low temperature oxide, phosphorous doped oxide, silicon oxynitride, or other suitable materials. The waveguiding layer may in some embodiments be greater than or equal to 1 µm, 5 µm, 10 µm, or 20 µm thick. The waveguiding layer may in some embodiments be less than or equal to 1 µm, 5 µm, 10 µm, or 20 µm thick. The material(s) used in the waveguiding layer may be selected such that the material effectively transmits light and may form both the solid core of a solid-core waveguide and the walls of a fluid channel and/or the walls of a fluid-core waveguide.

After the waveguiding layer is disposed (e.g. placed or deposited) on the substrate layer, one or more etching steps may be performed in order to form one or more of a solid-core waveguide and one or more a fluid channels (which may in some embodiments also be fluid-core waveguides). To form a fluid channel, the hollow core of the channel may be etched out of the waveguiding layer.

In some embodiments, the dimensions of the fluid channel may be varied to affect the flow speed of a fluid through the fluid channel. In some embodiments, flow of fluid through the fluid channel may be cause by one or more of vacuum, positive pressure, electroosmosis, and/or electrophoresis. In some embodiments, geometries of the fluid channel may be formed to cause flow focusing via sheath flow. In some embodiments, a height and or width of a channel fluid channel may be less than or equal to 0.25 µm, 0.5 µm, 1 µm, 5 µm, 10 µm, 25 µm, 50 µm, 100 µm, 250 µm, 500 µm, or 1000 µm. In some embodiments, a height and or width of a channel fluid channel may be greater than or equal to 0.25 µm, 0.5 µm, 1 µm, 5 µm, 10 µm, 25 µm, 50 µm, 100 µm, 250 µm, 500 µm, or 1000 µm. In some embodiments, a flow speed through a fluid channel may be less than or equal to 0.005 µL/min, 0.01 µL/min, 0.1 µL/min, 1 µL/min, 10 µL/min, 100 µL/min, or 500 µL/min. In some embodiments, a flow speed through a fluid channel may be greater than or equal to 0.005 µL/min, 0.01 µL/min, 0.1 µL/min, 1 µL/min, 10 µL/min, 100 µL/min, or 500 µL/min.

To form a solid core waveguide, air-gaps may be etched out of the waveguiding layer on each side of the solid-core waveguide, such that the solid-core waveguide is formed from the remaining material of the waveguiding layer left between the air gaps. In some embodiments, the etching steps may comprise dry etching such as reactive-ion etching, deep reactive ion etching, and/or neutral loop discharge etching; in some embodiments, the etching steps may comprise wet etching such as etching with buffered hydrofluoric acid. In some embodiments, in addition to etching air gaps to define areas to each side of the solid-core waveguide, the etching process may also comprise etching an area at an end of the solid-core waveguide, thereby forming an end of the optical waveguide (e.g., an optical facet) into which light may be coupled.

After etching the waveguiding layer to form the solid core waveguide(s) and the fluid channel(s), a cover layer may be applied to the top of the waveguiding layer to enclose the open top side of the fluid channel and/or to enclose one or more of the air-gaps. In some embodiments, the cover layer may comprise bonded glass, ARROW layers, or total-internal-reflection-coated (e.g., low refractive index materials such as TEFLON AF) or metal-coated materials. In some embodiments, the cover layer may be less than or equal to 1 µm, 5 µm, 10 µm, 50 µm, 100 µm, 150 µm, or 200 µm, 300 µm, or 500 µm thick. In some embodiments, the cover layer may be greater than or equal to 1 µm, 5 µm, or 10 µm, 50 µm, 100 µm, 150 µm, or 200 µm, 300 µm, or 500 µm. In some embodiments, the cover layer may be affixed to the waveguiding layer (or to another layer of the waveguide structure, as discussed further below), by permanent or impermanent bonding, adhesive gluing, or other suitable means.

After the etching and attachment of the cover layer is complete, the fluid channel may be filled with fluid (e.g., gas and/or liquid), such as a gas or liquid containing analytes to be excited by excitation light that propagates along the solid-core waveguide and is incident upon the fluid channel. In some embodiments, emission from analytes in the fluid channel may be collected out-of-plane (e.g., by overhead or underneath photodetectors) or in-plane (e.g., by being guided to an in-plane photodetector by the fluid channel when the fluid channel is a fluid-core waveguide or by capture of said emission by a solid-core waveguide structure without the use of a fluid-core waveguide).

In some embodiments, performance of the fluid channel as a fluid-core waveguide (e.g., for in-plane detection of emission light) may be increased by reducing wall thicknesses, by reducing cladding material average refractive index or by etching out some of the substrate layer beneath the channel, as discussed further below.

Figure 1B:
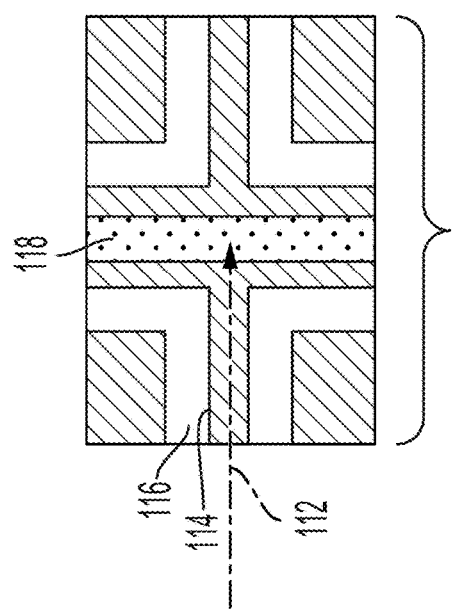

FIGS. 1A and 1B depict two schematic views of a waveguide structure 100, in accordance with some embodiments. FIG. 1A shows a cross-sectional view from two angles of the waveguide structure 100, with the two views demarcated by the dotted line indicating a 90° corner 102. FIG. 1B shows an overhead view of the waveguide structure 100.

As shown in FIG. 1A, the waveguiding layer 104 may be formed of one or more oxide layers. In some embodiments, a low-index oxide layer 106 may be disposed atop a substrate (e.g., silicon) layer 108, and a high-index oxide layer 110 may be disposed atop the low-index oxide layer 106.

The two oxide layers may together form the waveguiding layer 104. As light 112 propagates through the high-index oxide layer 110, it may be internally reflected along the solid-core waveguide 114 by the air-gaps 116 and/or the low-index oxide layer 106. In some embodiments, the low-index oxide layer 106 and the substrate layer 108 may both be replaced by a low-index substrate layer.

As shown in FIG. 1A, the etching steps forming the air gaps 116 and fluid channel 118 may be performed such that the high-index oxide layer 110 and the low-index oxide layer 106 are etched into and/or through simultaneously. That is, rather than etching the oxide layers separately and then aligning the gaps/channels etched into them, the etching may be performed after the layers are already bonded to one another, thereby achieving automatic alignment. As shown in the example of FIG. 1, the channel 118 and/or air gaps 116 may in some embodiments be formed by etching entirely through the high-index oxide layer 110 from above and partially into the low-index oxide layer 106 from above. In some embodiments, waveguide structure 100 may comprise cover layer 120, which may be applied to the top of the waveguiding layer 104 to enclose the open top side of the fluid channel 118 and/or enclose one or more the air-gaps 116.

In some embodiments of any of the waveguide structures disclosed herein, one or more of the waveguide layers may be placed or deposited atop another one of the layers. In some embodiments, one or more layers may be deposited via sputter, spin-on, plasma-enhanced chemical vapor deposition (PECVD), low pressure chemical vapor deposition (LPCVD), e-beam evaporation, and/or any other deposition method.

As there is only one lithographic step, it may be very easy using this method to create more complicated waveguide structures and expose individual dies for this process (e.g. e-beam defined features). Furthermore, there is no need for aligning masks between fabrication steps in this workflow.

In some embodiments of waveguide structure 100 and/or of other waveguide structures discussed herein, an index of refraction of a high-index oxide (e.g., layer 110) may be less than or equal to 1, 2, 3, or 4. In some embodiments of FIG. 1 and/or of other waveguide structures discussed herein, an index of refraction of a high-index oxide (e.g., layer 110) may be greater than or equal to 1, 2, 3, or 4.

In some embodiments of waveguide structure 100 and/or of other waveguide structures discussed herein, an index of refraction of a low-index oxide (e.g., layer 106) may be less than or equal to 1, 2, 3, or 4. In some embodiments of FIG. 1 and/or of other waveguide structures discussed herein, an index of refraction of a low-index oxide (e.g., layer 106) may be greater than or equal to 1, 2, 3, or 4.

In some embodiments of waveguide structure 100 and/or of other waveguide structures discussed herein (see, e.g., FIGS. 15 and 16 below), an index of refraction of a doped oxide may be less than or equal to 1, 2, 3, or 4. In some embodiments of FIG. 1 and/or of other waveguide structures discussed herein, an index of refraction of a doped oxide may be greater than or equal to 1, 2, 3, or 4.

In some embodiments, a thickness of an oxide layer adjacent to a substrate layer (e.g., low-index oxide layer 106) may be less than or equal to 0.05 µm, 0.1 µm, 0.5 µm, 1 µm, 5 µm, 10 µm, or 50 µm. In some embodiments, a thickness of an oxide layer adjacent to a substrate layer (e.g., low-index oxide layer 106) may be greater than or equal to 0.05 µm, 0.1 µm, 0.5 µm, 1 µm, 5 µm, 10 µm, or 50 µm. In some embodiments, an oxide layer adjacent to a substrate layer (e.g., low-index oxide layer 106) thicker may improve guiding properties of the waveguides and/or to reduce the background photoluminescence from adjacent silicon/substrate material.

In some embodiments, a thickness of a core oxide layer (e.g., high-index oxide layer 110) may be less than or equal to 0.5 µm, 1 µm, 2.5 µm, 5 µm, 7.5 µm, 10 µm, or 15 µm. In some embodiments, a thickness of a core oxide layer (e.g., high-index oxide layer 110) may be greater than or equal to 0.5 µm, 1 µm, 2.5 µm, 5 µm, 7.5 µm, 10 µm, or 15 µm.

Figure 2A:
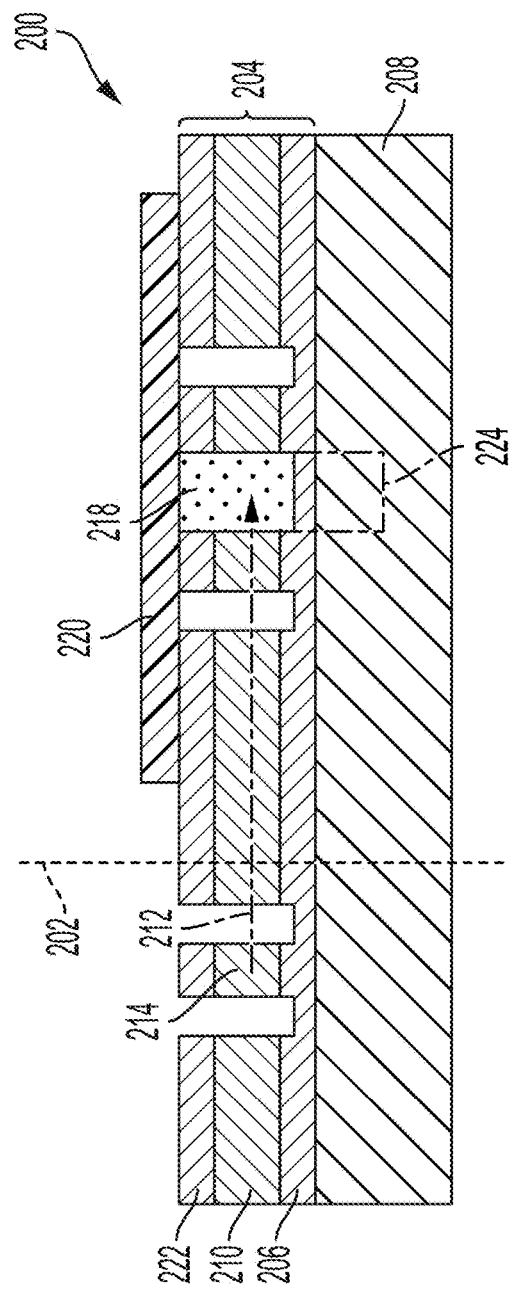
FIGS. 2A and 2B depict two schematic views of a waveguide structure having a low-index layer beneath a bonded cover layer, in accordance with some embodiments.
Figure 2B:
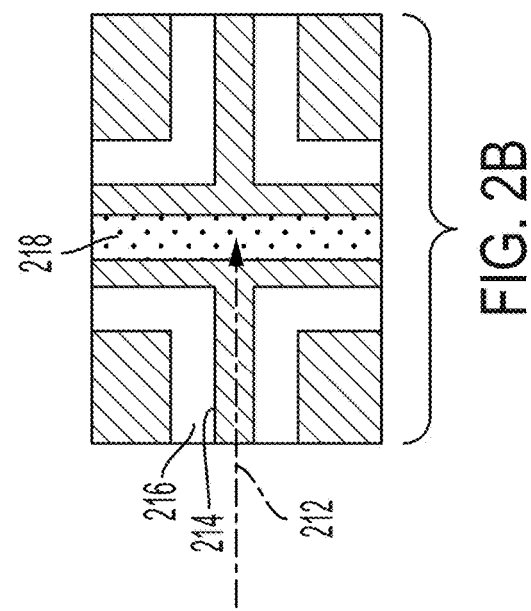

FIGS. 2A and 2B depict two schematic views of a waveguide structure 200 having a low-index layer 206 beneath a bonded cover layer 220, in accordance with some embodiments. FIG. 2A shows a cross-sectional view from two angles of the waveguide structure 200, with the two views demarcated by the dotted line indicating a 90° corner 202. FIG. 2B shows an overhead view of the waveguide structure 200.

The waveguide structure 200 shown in FIG. 2 may share any one or more characteristics in common with the waveguide structure 100 shown in FIG. 1, and may differ from the structure 100 shown in FIG. 1 in that the waveguiding layer 204 of the structure in FIG. 2 may comprise an additional low-index oxide layer 222 on top of the high-index oxide layer 210 and below the cover layer 220. In some embodiments, the second low-index oxide layer 222 may be disposed (e.g., placed or deposited) on top of the other oxide layers following the other oxide layers being disposed (e.g., placed or deposited). As light 212 propagates through the high-index oxide layer 210, it may be internally reflected along the solid-core waveguide 214 by the air-gaps 216, the low-index oxide layer 206, and/or the additional low-index oxide layer 222.

In some embodiments, a thickness of the second low-index oxide layer 222 may be less than or equal to 0.5 µm, 1 µm, 2.5 µm, 5 µm, 7.5 µm, 10 µm, or 15 µm. In some embodiments, a thickness of the second low-index oxide layer 222 may be greater than or equal to 0.5 µm, 1 µm, 2.5 µm, 5 µm, 7.5 µm, 10 µm, or 15 µm.

In some embodiments, the etching steps forming the air gaps 216 and fluid channel 218 may be performed such that the high-index oxide layer 210 and both low-index oxide layers 206, 222 are etched into and/or through simultaneously. That is, rather than etching the oxide layers separately and then aligning the gaps/channels etched into them, the etching may be performed after the layers are already bonded to one another, thereby achieving automatic alignment. As shown in the example of waveguide structure 200, the channel 218 and/or air gaps 216 may in some embodiments be formed by etching entirely through the upper low-index oxide layer 222 from above, entirely through the high-index oxide layer 210 from above, and partially into the low-index oxide layer 206 from above. In some embodiments, the etch forming the fluid channel 218 may cut entirely through the waveguiding layer 204 and partially into the substrate layer 208 (as shown by dashed profile 224).

The presence of bottom 206 and top low-index layer 222 (or alternatively ARROW layers) may create well defined waveguides, and the cover layer 220 may enable the use of any type of material to seal the liquid channel 218, without significantly interfering with the optical properties needed for waveguiding in the solid-core waveguide 214 and, in some embodiments, in the fluid-core waveguide.

FIGS. 3A and 3B depict two schematic views of a waveguide structure 300 comprising low-index doping regions 326 defining one or more waveguides, in accordance with some embodiments. FIG. 3A shows a cross-sectional view from two angles of the waveguide structure 300, with the two views demarcated by the dotted line indicating a 90° corner 302. FIG. 3B shows an overhead view of the waveguide structure 300.

The waveguide structure 300 shown in FIG. 3 may share any one or more characteristics in common with the waveguide structure 100 shown in FIG. 1, and may differ from the structure 100 shown in FIG. 1 in that, alternately or additionally to defining the solid-core waveguide 314 and/or the fluid-core waveguide by etching air gaps 316, dopant diffusion through a photomask may be used to define areas 326 in the waveguiding layer 304 where the index of refraction is lower than elsewhere in the waveguiding layer 304.

In some embodiments, dopant diffusion may include ion diffusion, ion exchange, and/or ion implantation. In some embodiments, ions used in dopant diffusion may include He+, N+, O+, Si+, P+, Ti+, Ge+, or any one or more of the ions indicated in Righini, G. C. & Chiappini, A. Glass optical waveguides: a review of fabrication techniques. OE, OPEGAR 53, 071819 (2014); Peña-Rodríguez, O. et al. Optical Waveguides Fabricated by Ion Implantation/Irradiation: A Review. *Ion implantation* (InTech, 2012); and/or Chen, F., Wang, X. L. & Wang, K. M. Development of ion-implanted optical waveguides in optical materials: A review. *Optical Materials* 29, 1523-1542 (2007). Thus, as shown in the overhead view in FIG. 3b, the solid-core waveguide 314 may be defined by the area between the two doping areas 326. In some embodiments, using dopants to define the waveguides may create a structure 300 having less refraction and scattering of light 312 as compared to structures relying on etching to form a solid-core waveguide 314, which may reduce background signal of a chip.

In some embodiments, dopant diffusion in the waveguiding layer 304 may also be used to define regions beside, below, and/or above a waveguide, including a solid-core waveguide 314 and/or a fluid-core waveguide. In some embodiments, the waveguiding layer 304 includes a low-index oxide layer 306 and high-index oxide layer 310. A low-index oxide layer 306 may be disposed atop a substrate (e.g., silicon) layer 308, and a high-index oxide layer 310 may be disposed atop the low-index oxide layer 306. In some embodiments, additional doping areas 328 may be included to define particular modes in the waveguides or generate other optical phenomena. The additional doping areas 328 may be located within the low-index oxide layer 306 (that is disposed on the substrate layer 308) and/or located within the high-index oxide layer 310 (that is disposed under the cover layer 320).

In some embodiments, dopant diffusion may be performed before one or more etching steps, and in some embodiments it may be performed after one or more etching steps.

FIGS. 4A and 4B depicts two schematic views of a waveguide structure 400 comprising high-index doping regions defining a waveguide, in accordance with some embodiments. FIG. 4A shows a cross-sectional view from two angles of the waveguide structure 400, with the two views demarcated by the dotted line indicating a 90° corner 402. FIG. 4B shows an overhead view of the waveguide structure 400.

The waveguide structure 400 in FIG. 4 may share any one or more characteristics in common with the waveguide structure 300 shown in FIG. 3. Like the waveguide structure 300 shown in FIG. 3, the waveguide structure 400 shown in FIG. 4 may include one or more waveguides created and defined by dopant diffusion, such as dopant diffusion through a photomask. While the structure 300 shown in FIG. 3 may be created using dopant diffusion that defines doped regions 326 having a lower index of refraction than surrounding regions, the structure 400 shown in FIG. 4 may instead be created using dopant diffusion that defines doped regions having a higher index of refraction than surrounding regions. In some embodiments, germanium or other suitable ions such as one or more of those indicated above may be used to create high-index areas via doping. It should be noted that, in some embodiments, index variations created by doping waveguiding layers 404 may include instantaneous spatial changes in index (e.g., step-changes) and/or may include gradual spatial increases or decreases in index.

Thus, as shown in the overhead view in FIG. 4B, the solid-core waveguide 414 may be defined by the doping area itself, which may have a higher index of refraction than the non-doped oxide in the waveguiding layer 404. In some embodiments, using dopants to define the waveguides may create a structure 400 having less refraction and scattering of light 412 as compared to structures relying on etching to form a solid-core waveguide 414, which may reduce background signal of a chip. In some embodiments, the waveguiding layer 404 may include an oxide layer 406 disposed atop a substrate layer 408. The waveguiding layer 404 may also include air-gaps 416, and a fluid channel 418. In some embodiments, a cover layer 420 may be disposed atop the waveguiding layer 404.

In some embodiments, dopant diffusion may be performed before one or more etching steps, and in some embodiments it may be performed after one or more etching steps.

Figure 5A:
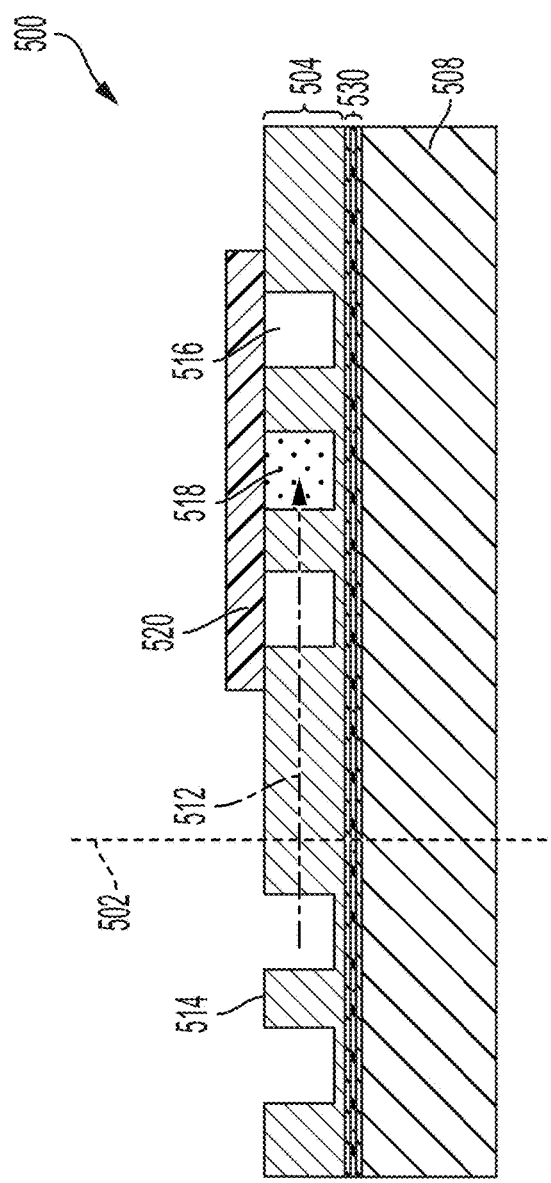
FIGS. 5A and 5B depict two schematic views of a waveguide structure comprising ARROW layers, in accordance with some embodiments.
Figure 5B:
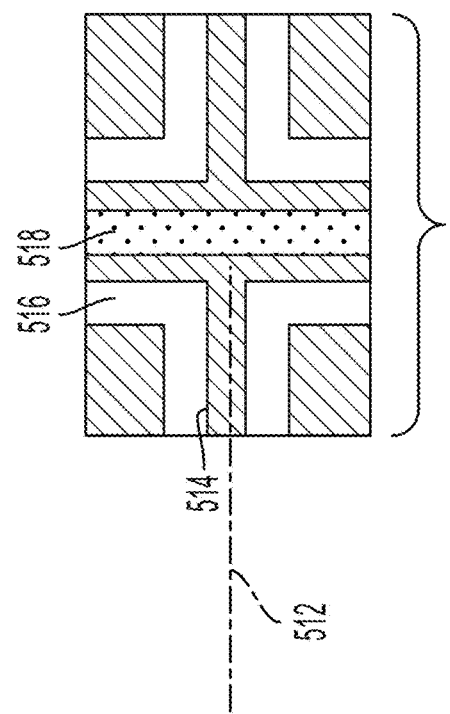

FIGS. 5A and 5B depict two schematic views of a waveguide structure 500 comprising ARROW layers 530, in accordance with some embodiments. FIG. 5A shows a cross-sectional view from two angles of the waveguide structure 500, with the two views demarcated by the dotted line indicating a 90° corner 502. FIG. 5B shows an overhead view of the waveguide structure 500.

The waveguide structure 500 shown in FIG. 5 may share any one or more characteristics in common with the waveguide structure 100 shown in FIG. 1, and may differ from the structure 100 shown in FIG. 1 in that the structure 500 further comprises an ARROW layer 530 above the substrate 508 and below the waveguiding layer 504. The ARROW layers 530 may, in some embodiments, be disposed (e.g., placed or deposited) on top of the substrate layer 508 and the waveguiding layer(s) 504 may then be disposed (e.g., placed or deposited) atop the ARROW layers 530. In some embodiments in which an ARROW layer 530 is used below the waveguiding layer 504, the waveguiding layer 504 may have a constant index of refraction from top to bottom, rather than being comprised of multiple different oxide layers having different indexes of refraction.

As shown in the cross-sectional view of FIG. 5A, the channel 518 and/or air gaps 516 may in some embodiments be formed by etching partially into the waveguiding layer 504 without etching all the way through, in order to prevent etching into the ARROW layers 530 and compromising their optical properties. In some embodiments, the solid-core waveguide 514 can be defined through etching. In some embodiments, a cover layer 520 may be disposed atop the waveguiding layer 504.

In some embodiments, an overall thickness of the ARROW layers 530 (e.g., total stack thickness) may be less than or equal to 0.1 μm, 0.2 μm, 0.5 μm, 1 μm, 5 μm, 10 μm, or 15 μm. In some embodiments, an overall thickness of the ARROW layers 530 (e.g., total stack thickness) may be greater than or equal to 0.1 μm, 0.2 μm, 0.5 μm, 1 μm, 5 μm, 10 μm, or 15 μm. Overall thickness of the ARROW layers 530 may vary depending on the number of alternating layers and/or the desired guiding properties, for example for guiding light 512.

FIGS. 6A and 6B depict two schematic views of a waveguide structure 600 comprising ARROW layers 630 and an etch-stop layer 632, in accordance with some embodiments. FIG. 6A shows a cross-sectional view from two angles of the waveguide structure 600, with the two views demarcated by the dotted line indicating a 90° corner 602. FIG. 6B shows an overhead view of the waveguide structure 600.

The waveguide structure 600 shown in FIG. 6 may differ from the structure 500 shown in FIG. 5 in that the structure 600 further comprises an etch-stop layer 632 above the ARROW layer 630 and beneath the waveguiding layer 604. In some embodiments, the etch-stop layer 632 may be a localized etch-stop layer that is positioned beneath the area to be etched away to form the fluid channel 618. In this way, the etching steps that form the air-gaps 616 may be allowed to etch all the way through the waveguiding layer 604, into and/or through the ARROW layers 630, and into the substrate layer 608; however, the etching step that forms the fluid channel 618 may be prevented by the etch-stop layer 632 from etching into or through the ARROW layers 630. Thus, the ARROW layers 630 may be protected and preserved at the location beneath the fluid channel 618, while the ARROW layers 630 at other locations on the structure 600 may be etched through.

In some embodiments, following the step of etching the fluid channel 618, the localized etch-stop layer 632 may be dissolved, such as by wet-etching, or may otherwise be removed such that the hollow core of the fluid channel 618 directly abuts the ARROW layers 630. In some embodiments, such as when the etch-stop layer 632 is compatible with the desired optical properties of the ARROW layer 630, the etch-stop layer 632 may be left in place.

In some embodiments, the etch-stop layer 632 may comprise metal, dielectric material, polycrystalline material, and/or other suitable materials. In some embodiments, material for an etch-stop layer 632 may be selected such that the material has a sufficiently different etch rate when compared to that of one or more materials of the waveguide layer 604.

In some embodiments, a thickness of the etch-stop layer 632 may be less than or equal to 0.05 μm, 0.1 μm, 0.5 μm, 1 μm, 2.5 μm, 5 μm, or 10 μm. In some embodiments, a thickness of the etch-stop layer 632 may be greater than or equal to 0.05 μm, 0.1 μm, 0.5 μm, 1 μm, 2.5 μm, 5 μm, or 10 μm.

Figure 7A:
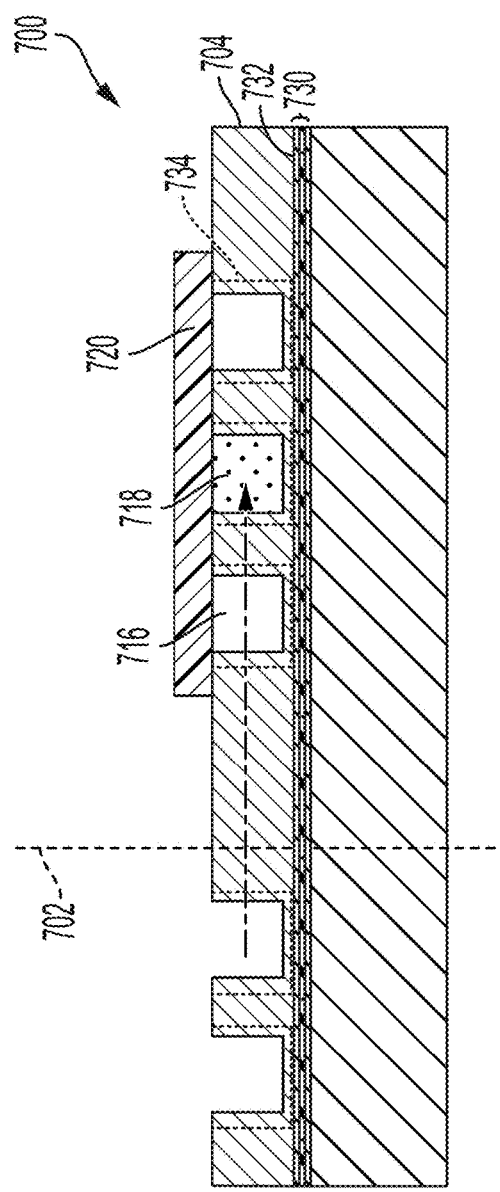
FIGS. 7A and 7B depict two schematic views of a waveguide structure comprising ARROW layers and formed using a wet-etch finish technique, in accordance with some embodiments.
Figure 7B:
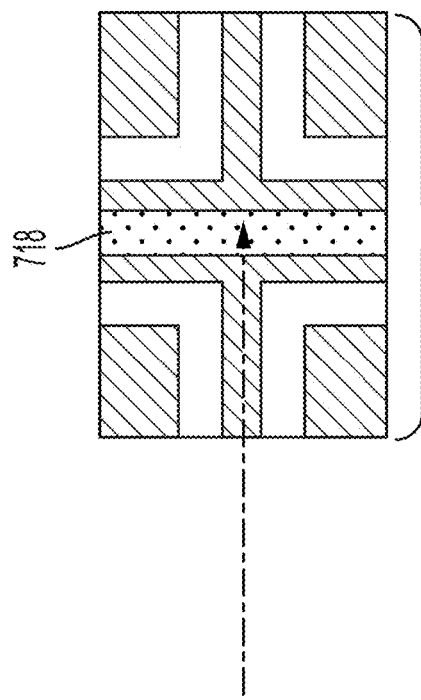

FIGS. 7A and 7B depict two schematic views of a waveguide structure 700 comprising ARROW layers 730 and formed using a wet-etch finish technique, in accordance with some embodiments. FIG. 7A shows a cross-sectional view from two angles of the waveguide structure 700, with the two views demarcated by the dotted line indicating a 90° corner 702. FIG. 7B shows an overhead view of the waveguide structure 700.

The waveguide structure 700 shown in FIG. 7 may share any one or more characteristics in common with the waveguide structure 500 shown in FIG. 5, and may differ from the structure 500 shown in FIG. 5 in that, for each of the air gaps 716 and for the fluid channel 718, following a first etching step (e.g., a rough, deep etching step), a second etching step may be performed in order to etch completely through the waveguiding layer 704 and down to (but not into) the ARROW layers 730. In some embodiments, the first etching step may be a deep etch while the second etching step may be a wet-etch. In some embodiments, the second etching step may be used to etch further 734 down and/or further to the sides of the gap 716 or channel 718 being etched. In some embodiments, an outermost (e.g., top or bottom) layer of the ARROW layers 730 may be an etch-stop arrow configured to prevent the wet-etching step(s) from etching into and compromising the ARROW layers 730. By selecting the outermost ARROW layer to be an effective etch-stop for an etching process such as a wet-etch, and by applying a subsequent wet-etch after a deep-etch, it is possible to achieve non-damaged ARROW layers 730 directly under the fluid channel 718.

In some embodiments, in order to achieve relatively vertical sidewalls of a channel 718 and/or air gap 716, an etch could be done to substantial depths such that the top of the profile of the channel 718 and/or air gap 716 is relatively vertical.

Figure 8:
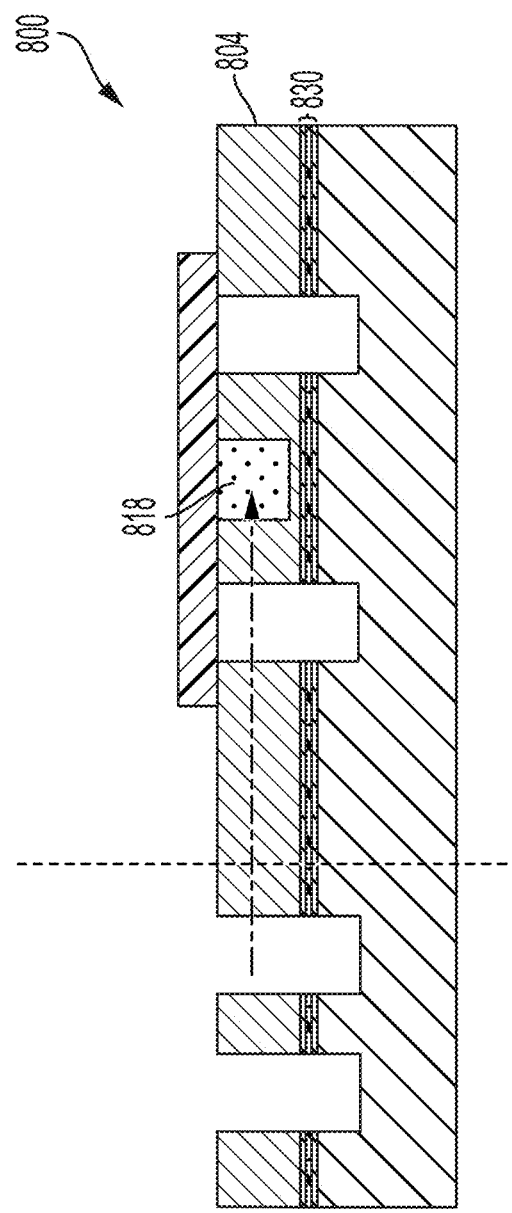
FIG. 8 depicts a schematic view of a waveguide structure comprising ARROW layers and variable-depth etching, in accordance with some embodiments.

FIG. 8 depicts a schematic view of a waveguide structure 800 comprising ARROW layers 830 and variable-depth etching, in accordance with some embodiments. FIG. 8 shows a cross-sectional view from two angles of the waveguide structure 800, with the two views demarcated by the dotted line indicating a 90° corner 802.

The waveguide structure 800 shown in FIG. 8 may share any one or more characteristics in common with the waveguide structure 600 shown in FIG. 6, and may differ from the structure 600 shown in FIG. 6 in that the structure 800 in FIG. 8 may not have a localized etch-stop layer (or any etch-stop layer, e.g., layer 632). Thus, during etching, the etch forming the liquid channel 818 may stop short of cutting all the way through the waveguiding layer 804 and into the ARROW layers 830, even without the etch being stopped by an etch-stop layer (e.g., layer 632).

FIGS. 9A and 9B depict two schematic views of a waveguide structure 900 comprising ARROW layers 930 and an etch-stop layer 932 located underneath multiple trenches, in accordance with some embodiments. FIG. 9A shows a cross-sectional view. FIG. 9B shows an overhead view of the waveguide structure 900.

The waveguide structure 900 shown in FIG. 9 may share any one or more characteristics in common with the waveguide structure 600 shown in FIG. 6, and may differ from the structure 600 shown in FIG. 6 in that the etch-stop layer 932 included in the structure 900 may not be localized solely to a location corresponding to the fluid channel 918. Instead, the etch-stop layer 932 may extend to areas beneath one or more other etches, such as one or more of the air gaps 916 etched out of the waveguiding layer 904. Accordingly, the non-localized etch-stop layer 932 may prevent the etches that form the fluid channel 918 and the etches that form the one or more air-gaps 916 from extending into the ARROW layers 930.

In some embodiments, the etch-stop layer 932 may fully or partially be dissolved or otherwise removed after one or more etching steps. In some embodiments, the etch-stop layer 932 may remain present under the solid-core waveguide 914 (e.g., even if it is removed from the areas where etching is performed at the fluid channel 918 and the air-gaps 916), so the etch-stop layer 932 may be transparent such that it does not block light 912 in the solid-core waveguide 914 from propagating into the ARROW layers 930. In some embodiments, a transparent etch-stop layer 932 may comprise one or more oxides. (In some embodiments, a non-transparent etch-stop layer 932 may comprise one or more metals, which may in some embodiments be removed from the waveguide structure 900 using a secondary process step, such as an additional etching step.)

In some embodiments, a thickness of a transparent etch-stop layer 932 may be less than or equal to 0.5 µm, 1 µm, 2.5 µm, 5 µm, 7.5 µm, 10 µm, or 15 µm. In some embodiments, a thickness of a transparent etch-stop layer 932 may be greater than or equal to 0.5 µm, 1 µm, 2.5 µm, 5 µm, 7.5 µm, 10 µm, or 15 µm.

FIGS. 10A and 10B depict two schematic views of a waveguide structure 1000 comprising air-gaps 1036 formed in a substrate layer 1008, in accordance with some embodiments. FIG. 10A shows a cross-sectional view from two angles of the waveguide structure 1000, with the two views demarcated by the dotted line indicating a 90° corner 1002. FIG. 10B shows an overhead view of the waveguide structure 1000.

The waveguide structure 1000 shown in FIG. 10 may share any one or more characteristics in common with the waveguide structure 100 shown in FIG. 1, and may differ from the structure 100 shown in FIG. 1 in that, in addition to the top-down etching performed to create the fluid channel 1018 and solid-core waveguide 1014 in the waveguiding layer 1004, bottom-up etching may also be performed in order to remove part of the substrate layer 1008 and to expose the underside of the waveguiding layer 1004 to one or more air-gaps 1036 beneath the fluid channel 1018 and/or the solid-core waveguide 1014. By creating the one or more air-gaps 1036 beneath the fluid channel 1018 and/or the solid-core waveguide 1014, the need for ARROW layers (e.g., layers 930) or for low-index oxide layers may be eliminated, as the air-gap 1036 carved out of the substrate layer 1008 may itself prevent light 1012 in the solid-core waveguide 1014 and/or the fluid channel 1018 (which may serve as a fluid-core waveguide) from leaking downward and out of the waveguide 1014/channel 1018.

In some embodiments, etching into the substrate layer 1008, such as by etching into the side of the substrate layer 1008 opposite the waveguiding layers 1004 as shown in FIG. 10, may be used additionally or alternatively to form one or more fluidic channels and/or other structures for fluidic routing through the substrate layer 1008.

In some embodiments, etching into the substrate layer 1008, such as by etching into the side of the substrate layer 1008 opposite the waveguiding layers 1004 as shown in FIG. 10, may be used additionally or alternatively to form structures on the waveguide structure 1000 for use in physically positioning the waveguide structure 1000. In some embodiments, microfabrication of the substrate 1008 may be used to form one or more kinematic structures. In some embodiments, one or more structures formed via etching into the substrate layer 1008 may be used to attach and/or physically interact with a physical positioning and/or alignment system. In some embodiments, one or more structures formed via etching into the substrate layer 1008 may be filled with, may receive, and/or may otherwise attach to magnetic material and/or one or more magnetic components for use in kinematic applications.

FIGS. 11A and 11B depict two schematic views of a waveguide structure 1100 comprising air-gaps 1136 formed in a substrate layer 1108 and comprising lenses 1138 for light collection, in accordance with some embodiments. FIG. 11A shows a cross-sectional view from two angles of the waveguide structure 1100, with the two views demarcated by the dotted line indicating a 90° corner 1102. FIG. 11B shows an overhead view of the waveguide structure 1100.

The waveguide structure 1100 shown in FIG. 11 may share any one or more characteristics in common with the waveguide structure 1000 shown in FIG. 10, and may differ from the structure 1000 shown in FIG. 10 in that the structure 1100 may further include one or more lenses, for example for use in out-of-plane excitation light collection. As shown, one or more lenses such as lens 1138 may be included in or affixed to the cover layer 1120, such as by adhesive gluing, permanent or impermanent bonding, or by fabrication within the cover layer 1120 itself, for overhead collection of excitation light 1112 from the fluid channel 1118. Alternately or additionally, one or more lenses such as lens 1140 may be attached underneath the fluid channel 1118 following etching the underside air-gap 1136 out of the substrate 1108, for underside collection of excitation light 112 from the fluid channel 1118. In some embodiments, the one or more lenses 1138, 1140 may be formed from a polymeric material, dielectric material, glass, or any other suitable material.

Figure 12A:
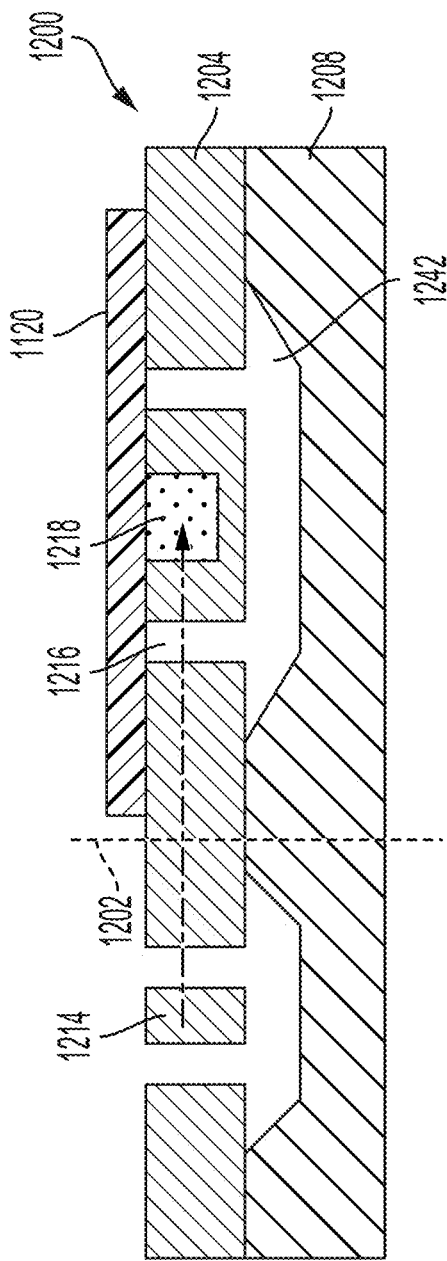
FIGS. 12A and 12B depict two schematic views of a waveguide structure comprising undercut air-gaps formed in a substrate layer, in accordance with some embodiments.
Figure 12B:
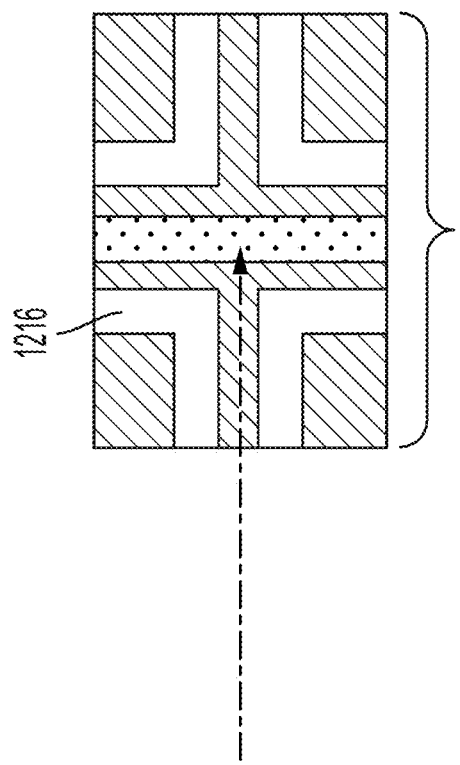

FIGS. 12A and 12B depict two schematic views of a waveguide structure 1200 comprising undercut air-gaps 1242 formed in a substrate layer 1208, in accordance with some embodiments. FIG. 12A shows a cross-sectional view from two angles of the waveguide structure 1200, with the two views demarcated by the dotted line indicating a 90° corner 1202. FIG. 12B shows an overhead view of the waveguide structure 1200.

The waveguide structure 1200 shown in FIG. 12 may share any one or more characteristics in common with the waveguide structure 1000 shown in FIG. 10, and may differ from the structure 1000 shown in FIG. 10 in that the air gap(s) 1242 beneath the fluid channel 1218 and/or the solid-core waveguide 1214 may be created not by etching the substrate layer 1208 from below, but rather by performing an under-etch (e.g., a potassium hydroxide (KOH) etch) to cut from the air gaps 1216 initially etched into the waveguiding layer 1204 into and underneath the solid-core waveguide 1214 and/or the fluid channel 1218. In some embodiments, under-etching may be performed in bridged sections, for example to prevent collapse of suspended structures.

FIGS. 13A and 13B depict two schematic views of a waveguide structure 1300 comprising a fiber alignment feature 1344, in accordance with some embodiments. FIG. 13A shows a cross-sectional view from two angles of the waveguide structure 1300, with the two views demarcated by the dotted line indicating a 90° corner 1302. FIG. 13B shows an overhead view of the waveguide structure 1300.

The waveguide structure 1300 shown in FIGS. 13A and 13B may share any one or more characteristics in common with the waveguide structure 100 shown in FIG. 1, and may differ from the structure 100 shown in FIG. 1 in that the structure 1300 may incorporate one or more traditional optical fibers, for example for use in guiding excitation light 1312. For example, instead of creating a solid-core waveguide by etching air-gaps into waveguiding layer 1304, an optical fiber 1346 may be used to guide light 1312 to the fluid channel 1318 (which may be formed in the same manner as discussed elsewhere herein). In some embodiments, an optical fiber 1346 may be used to guide excitation light 1312 to a solid-core waveguide formed as discussed elsewhere herein.

FIGS. 14A-14D depict four schematic views of a waveguide structure 1400 during various stages of a CMP (chemical mechanical polishing)-based trench fabrication method, in accordance with some embodiments. The waveguide structures 1400 shown in FIG. 14 may share any one or more characteristics in common with the waveguide structure 100 shown in FIG. 1. Unlike some other embodiments discussed herein, the technique shown in FIG. 14 may depend in large part on machining one or more features into a silicon substrate 1408 (or other non-oxide substrate), in addition to or in place of etching into one or more oxides. In some embodiments, waveguide structure fabrication techniques that depend on machining into silicon or other substrate materials may be simpler, faster, more efficient, and less expensive than techniques that depend primarily or exclusively on etching into oxides, as machining silicon may be a simpler and more standardized process than etching into oxides.

As shown in FIG. 14A, a silicon substrate 1408 may be machined (e.g., micromachined) in order to create two intersecting trenches (one shown on the right side 1448 of the 90-degree corner and the other shown on the left side 1450 of the 90-degree corner 1402). One or more oxides may then be deposited on the machined silicon substrate 1408, such that the machined trenches 1448, 1450 may be filled with the oxide 1406. After the oxide 1406 is disposed (e.g., deposited or placed), a fluid channel 1418 may be etched into the oxide 1406 shown to the right of the 90-degree corner 1402. (Alternately, in some embodiments, the oxide portions forming the fluid channel 1418 may be formed by oxidation of the etched silicon trench 1448, for example as discussed below with reference to FIGS. 17 and 18.)

As shown in FIG. 14B, oxide 1406 disposed (e.g., deposited or placed) on the substrate 1408 that is not inside one of the trenches 1448 or 1450 machined in the substrate 1406 may then be removed. In some embodiments, the oxide 1406 may be removed by CMP, while in some embodiments the oxide 1406 may be lifted off.

As shown in FIG. 14C, the silicon substrate 1408 surrounding the trench 1448 into which the fluid channel 1418 was etched may then be removed, for example by a KOH etch. In some embodiments, the substrate 1408 may be etched away from areas 1442 that can include one or both sides and part of the area below (e.g., by under-etching) the oxide 1406 forming the fluid channel 1418.

As shown in FIG. 14D, the silicon substrate 1408 surrounding the oxide-filled trench 1450 one the left side of the 90-degree corner 1402 may then be removed, for example by a KOH etch. In some embodiments, the substrate 1408 may be etched away from areas 1452 that can include one or both sides and part of the area below (e.g., by under-etching) the oxide 1406 forming the oxide-filled trench 1450.

Finally, as shown in FIG. 14D, a cover layer 1420 may be added to enclose the fluid channel 1418. The cover layer 1420 may share any one or more characteristics with other cover layers (e.g., cover layer 120) discussed elsewhere herein.

Thus, the oxide 1454 shown to the left side of the 90-degree corner 1402 may serve as a solid-core waveguide for light 1412 and the etched-out oxide 1456 shown to the right side of the 90-degree corner may serve as a fluid channel 1418 and/or fluid-core waveguide that intersects the solid-core waveguide (e.g., oxide 1454).

Figure 15A:
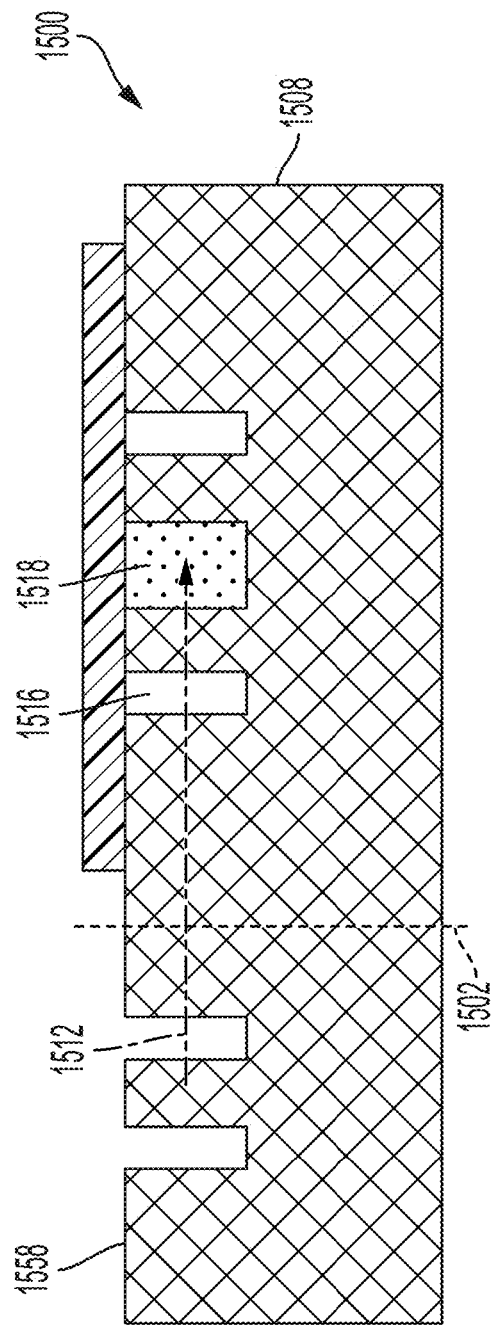
FIGS. 15A and 15B depict two schematic views of a waveguide structure comprising a doped oxide substrate, in accordance with some embodiments.
Figure 15B:
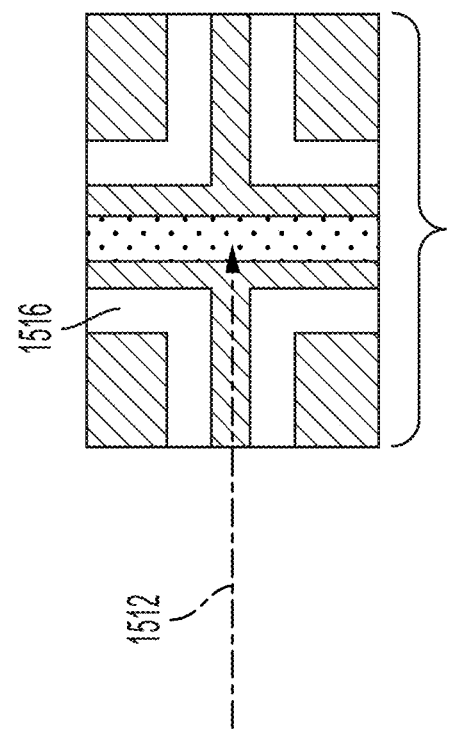

FIGS. 15A and 15B depicts two schematic views of a waveguide structure 1500 comprising a doped oxide substrate 1508, in accordance with some embodiments. FIG. 15A shows a cross-sectional view from two angles of the waveguide structure 1500, with the two views demarcated by the dotted line indicating a 90° corner 1502. FIG. 15B shows an overhead view of the waveguide structure 1500.

The waveguide structure 1500 shown in FIG. 15 may share any one or more characteristics in common with the waveguide structure 100 shown in FIG. 1, and may differ from the waveguide structure 100 shown in FIG. 1 and other waveguide structures (e.g., structures 200-1400) shown herein in that, rather than comprising a substrate (e.g., silicon) layer (e.g., layer 108) distinct from a waveguiding (e.g., oxide) layer (e.g., layer 104), the structure may be formed from a monolithic oxide substrate 1508 (e.g., a quartz glass wafer, Borofloat, BK7, fused silica, or single crystal quartz). In some embodiments, the oxide substrate 1508 may be doped by ions (e.g., see discussion of ion doping above) near a surface (e.g., the top surface 1558) of the substrate 1508 in order to create a gradient index of refraction in the oxide, such that the index of refraction in the oxide substrate 1508 is higher near the doped (e.g., top surface 1558) surface than it is further away from the doped surface (e.g., top surface 1558). In some embodiments, rather than using a mask to dope only certain regions, the entire surface (e.g., top surface 1558) of the oxide substrate 1508 may be subjected to a blanket doping. The etching steps as discussed elsewhere herein may then be performed by etching into the doped surface (e.g., top surface 1558) of the oxide substrate 1508 to form the fluid channel 1518 and the air gaps 1516. Because of the gradient index of refraction, excitation light 1512 in the fluid-core waveguide (e.g., the fluid channel 1518) defined between the etched air-gaps may be prevented from leaking downward into the low-index portions of the oxide substrate 1508. While a gradient index of refraction is discussed above, in some embodiments the index of refraction may change in one or more spatial step functions, in accordance with one or more spatial curves, and/or in accordance with one or more spatial gradients.

In some embodiments of FIG. 15 and/or of other waveguide structures discussed herein, an index of refraction of a doped oxide (e.g., layer 1508) may be less than or equal to 1, 2, 3, or 4. In some embodiments of FIG. 15 and/or of other waveguide structures discussed herein, an index of refraction of a doped oxide (e.g., layer 1508) may be greater than or equal to 1, 2, 3, or 4.

In some embodiments, by using a blanket doping technique across the entire oxide substrate 1508, there may be minimized deposition steps and lowered background because of a pure waveguide material. Furthermore, in some embodiments, using dopants to define the waveguides (e.g., solid-core waveguide 1514) could potentially lead to less refraction and scattering of light 1512, which could be an advantage in reducing background signal of the chip.

In some embodiments, light 1512 in the fluid channel 1518 may be able to leak out of the channel and down into the oxide substrate 1508, so the fluid channel 1518 may serve only as a channel and not as a fluid-core waveguide. However, in some embodiments, a deep etch may be performed on the underside of the substrate 1508 (or an undercut etch may be performed) in order to create an air-gap below the fluid channel 1518 and to cause the fluid channel 1518 to function as a fluid-core waveguide.

FIGS. 16A and 16B depicts two schematic views of a waveguide structure 1600 comprising a doped oxide substrate 1608 and a capping layer 1660 beneath a bonded cover layer 1620, in accordance with some embodiments. FIG. 16A shows a cross-sectional view from two angles of the waveguide structure 1600, with the two views demarcated by the dotted line indicating a 90° corner 1602 FIG. 16B shows an overhead view of the waveguide structure 1600.

The waveguide structure 1600 shown in FIG. 16 may share any one or more characteristics in common with the waveguide structure 1500 shown in FIG. 15, and may differ from the structure 1500 shown in FIG. 15 in that the structure 1600 may additionally comprise a protective layer 1660 atop the monolithic oxide substrate 1608 and beneath the cover layer 1620, which may optically protect the waveguide(s) (e.g., solid-core waveguide 1614, fluid-core waveguide 1618) formed in the monolithic oxide substrate 1608. The protective layer 1660 may be disposed (e.g. deposited or placed) on the oxide substrate 1608 after doping of the oxide substrate 1608 is performed. In some embodiments, the protective layer 1660 may comprise one or more oxides. The protective layer 1660 and the oxide substrate 1608 may then be etched into and/or through simultaneously.

In some embodiments of FIG. 16 and/or of other waveguide structures discussed herein, an index of refraction of a doped oxide (e.g., layer 1608) may be less than or equal to 1, 2, 3, or 4. In some embodiments of FIG. 16 and/or of other waveguide structures discussed herein, an index of refraction of a doped oxide (e.g., layer 1608) may be greater than or equal to 1, 2, 3, or 4.

FIGS. 17A and 17B depicts two schematic views of a waveguide structure 1700 formed by oxidizing and doping a machined substrate layer 1708 to form a waveguiding layer XXX, in accordance with some embodiments. FIG. 17A shows a cross-sectional view from two angles of the waveguide structure 1700, with the two views demarcated by the dotted line indicating a 90° corner 1702. FIG. 17B shows an overhead view of the waveguide structure.

The waveguide structure 1700 shown in FIG. 17 may share any one or more characteristics in common with the waveguide structure 100 shown in FIG. 1. Unlike some other embodiments discussed herein, the technique shown in FIG. 17 may depend in large part on machining one or more features into a silicon substrate 1708 (or other non-oxide substrate), in addition to or in place of etching into one or more oxides. In some embodiments, waveguide structure fabrication techniques that depend on machining into silicon or other sub strate materials 1708 may be simpler, faster, more efficient, and less expensive than techniques that depend primarily or exclusively on etching into oxides, as machining silicon may be a simpler and more standardized process than etching into oxides.

In some embodiments, a trench corresponding to a fluid channel 1718 may be in machined (e.g., micromachined) from the substrate 1708, and trenches corresponding to air gaps 1716 surrounding the fluid channel 1718 and an intersecting solid-core waveguide 1714 may be machined (e.g., micromachined) from the substrate 1708. Thus, the geometry of the fluid channel 118 and air gaps 116 etched into oxide 106, 110 as shown in FIG. 1 may be replicated, except that the geometry may be formed in a substrate 1708 such as a silicon wafer, rather than in a waveguiding layer 104 such as oxide.

Following formation of this geometry in the substrate 1708 via machining, a portion 1762 of the machined substrate 1708 (e.g., a portion near a top surface and/or near a surface exposed to a machined trench, channel, or gap) may then be converted (e.g., transmuted) into a waveguiding material in order to form an oxide 1706 (e.g., silicon dioxide) for a waveguiding layer 1704 from the portion 1762 of the substrate layer 1708. In some embodiments, the portion 1762 of the machined substrate 1708 may be converted via oxidation (e.g., thermal oxidation) to transform silicon into silicon dioxide and to thereby form silicon dioxide 1706 for the waveguiding layer 1704 in a portion 1762 of what was formerly a machined silicon substrate 1708. The silicon dioxide 1706 formed from the substrate may mimic the geometry of the machined substrate 1708. Therefore, the silicon dioxide material 1706 for forming the waveguiding layer 1704 may be formed from the machined substrate layer 1708 to comprise a fluid channel 1718 and air gaps 1716, formed from the respective machined trenches in the substrate layer 1708.

Following formation of the silicon dioxide material 1706 for the waveguiding layer 1704 (e.g., by oxidizing a portion 1762 of a silicon substrate 1708 to form a silicon dioxide waveguiding layer 1704), the waveguiding layer 1704 may be doped by ions (e.g., see discussions of ion doping above) near a surface (e.g., the top surface 1758) of the waveguiding layer 1704 in order to create one or more areas of high-index oxide 1710 near the doped surface (e.g., the top surface 1758) and to thereby complete the formation of the waveguiding layer 1704. In this way, the index of refraction may be higher near the doped surface (e.g., top surface 1758) than it is further away from the doped surface (e.g., the top surface 1758). In some embodiments, the entire surface of the waveguiding layer 1704 may be subjected to a blanket doping, and the doped features 1710 defined in the waveguiding layer 1704 by its formation from a machined substrate 1708 may thus define a solid-core waveguide 1714 and/or a waveguiding fluid channel 1718. In some embodiments, a solid-core waveguide 1714 is formed, as shown by the doped, protruding portion of the oxide 1706 to the left of the 90-degree corner 1702. In some embodiments, a waveguiding fluid channel 1718 is formed, as shown by the space between the two doped, protruding channel wall oxide portions 1766 to the right of the 90-degree corner 1702. Because of the higher index of refraction, excitation light 1712 in the fluid-core waveguide 1718 defined between the doped wall portions 1766 between the air-gaps 1716 may be prevented from leaking outward and/or downward.

In some embodiments, doping of the oxide layer 1706 may be used to create a gradient index of refraction in all or part of the oxide layer 1706, while in some embodiments the index of refraction may change in one or more spatial step functions, in accordance with one or more spatial curves, and/or in accordance with one or more spatial gradients.

In some embodiments, a protective layer (not shown in FIG. 17A, but which may in some embodiments comprise one or more oxides) may be disposed (e.g., deposited or placed) on the oxide layer 1706 after doping of the layer 1706 is performed.

Finally, a cover layer 1720 may be added to enclose the fluid channel 1718. The cover layer 1720 may share any one or more characteristics with other cover layers (e.g., cover layer 120) discussed elsewhere herein.

FIGS. 18A and 18B depict two schematic views of a waveguide structure 1800 formed by oxidizing and doping a machined substrate layer 1801 to form a waveguiding layer 1804, in accordance with some embodiments. FIG. 18A shows a cross-sectional view from two angles of the waveguide structure 1800, with the two views demarcated by the dotted line indicating a 90° corner 1802. FIG. 18B shows an overhead view of the waveguide structure 1800.

The waveguide structure 1800 shown in FIG. 18 may share any one or more characteristics in common with the waveguide structure 1700 shown in FIG. 17, and may differ from the waveguide structures 1700 discussed above with respect to FIG. 17 in that, following doping of oxide 1806 in the silicon dioxide portion of the waveguiding layer 1804 in order to create one or more regions of oxide 1810 having a higher index of refraction, and before adding the cover layer 1820, a second layer of oxide 1868 may be disposed (e.g., deposited or placed) atop the doped high-index oxide layer 1810. The second layer of oxide 1868 may be deposited, for example by conformal coating. In some embodiments, the second layer of oxide 1868 may have a lower index of refraction than the doped portions 1810 of the first layer of oxide 1806. In some embodiments, adding the second layer of oxide 1868 may protect the waveguiding properties of the first oxide layer 1806.

Following deposition of the second oxide layer 1868, a cover layer 1820 may then be added to enclose the fluid channel 1818. The cover layer 1820 may be bonded or attached directly to the uppermost oxide layer (e.g., layer 1868), and may share any one or more characteristics with other cover layers (e.g., cover layer 1720) discussed elsewhere herein.

FIG. 19 depicts two schematic views of a waveguide structure 1900 comprising air-gaps 1916 formed in a substrate layer 1908 and comprising lenses 1938 and 1940 for light collection and comprising an aperture layer 1970, in accordance with some embodiments. FIG. 19A shows a cross-sectional view from two angles of the waveguide structure 1900, with the two views demarcated by the dotted line indicating a 90° corner 1902. FIG. 19B shows an overhead view of the waveguide structure.

The waveguide structure 1900 shown in FIG. 19 may share any one or more characteristics in common with the waveguide structure 1100 shown in FIG. 11, and may differ from the waveguide structure 1100 discussed above with respect to FIG. 11 in that the structure 1900 may further include an aperture layer 1970 configured to allow light from signal to pass through to the aperture 1972 for collection while blocking other light. In some embodiments, one or more apertures formed in the aperture layer 1970 may be positioned near the fluid channel 1918 and near the lenses 1940 embedded into the substrate layer 1908 to allow signal light to pass from the fluid channel 1918 through the aperture layer 1970 and into the lens 1940 in the substrate 1908 for collection, while blocking background light that does not pass through the aperture 1972 and is instead blocked by opaque portions of the aperture layer 1970.

In some embodiments, the aperture layer 1970 may comprise one or more adjacent apertures, different shaped apertures, multiple apertures forming one or more patterns, and/or spectrally-dependent apertures (e.g., an aperture layer 1970 may in some embodiments comprise a stack of ARROW layers). In some embodiments, one or more apertures in the aperture layer 1970 may be used to spatially filter excitation light, such that, for example, a beam of excitation light incident on the waveguide structure 1900 may only be able to make it through one or more apertures in the aperture layer 1970.

As shown in FIG. 19, the aperture layer 1970 may be positioned above the substrate layer 1908 (e.g., the silicon layer) and the lenses 1940 embedded into the substrate layer 1908, and may be positioned below and adjacent to the fluid channel 1918. In some embodiments, as shown in the example of FIG. 19, the aperture layer 1970 may be embedded in a portion of the waveguiding layer 1904 such as by being sandwiched between two different low-index oxide layers. In some embodiments, a three-layer sandwich comprising two low-index oxide layers surrounding the aperture layer 1970 may itself be sandwiched between a substrate layer and a high-index oxide layer, as shown in FIG. 19.

An additional difference between FIG. 19 and FIG. 11 is that the waveguiding layer 1904 of FIG. 19 comprises both low-index oxide layers (e.g., layer 1906) and a high-index oxide layer (e.g., layer 1910). In some embodiments, positioning the aperture layer 1970 between two low-index oxide layers (and/or suspending the aperture layer in the center of a single low-index oxide layer 1906) may optically isolate the aperture layer 1970 from the waveguides in the waveguiding layer 1904, thereby preventing the aperture layer 1970 from absorbing light out of the waveguides. Furthermore, positioning the aperture layer 1970 between two low-index oxide layers (and/or suspending the aperture layer in the center of a single low-index oxide layer 1906) may physically isolate the aperture layer 1970 from the substrate layer 1908 and/or from upper portions of the waveguiding layer (e.g., layer 1910), thereby allowing etching and other post-processing steps to be performed on the substrate layer 1908 and/or the upper portions of the waveguiding layer (e.g., layer 1910) without disrupting or compromising the aperture layer 1970.

In some embodiments, the aperture layer 1970 may comprise chrome, nickel, another metal, one or more ARROW layers (e.g., a patterned ARROW layer), and/or another opaque material configured to block background light. In some embodiments, the aperture layer 1970 may be microfabricated, such that microfabrication (e.g., including sputtering, e-beam evaporation, spin coating, and/or one or more coating techniques) may be used to form one or more features of an aperture itself. In some embodiments, the substrate layer 1908 (e.g., a silicon substrate layer) may be coated with a thick layer (e.g., about equal to or greater than or equal to 2 µm) of an optically transparent material forming the lowermost low-index oxide layer 1906 (which may in some embodiments have the same or similar dimensions as other lowermost low-index oxide layers discussed herein). Microfabrication may then be used to create one or more features (e.g., one or more holes) in a thin (e.g., about equal to or less than 0.1 µm) layer of patterned absorbing material to form the aperture layer 1970 (which may in some embodiments have the same or similar dimensions as other aperture layers discussed herein). Next, a thick layer (e.g., about equal to or greater than 1 µm, 5 µm, or 10 µm) of an optically transparent low-index material may be deposited atop the aperture layer to form another low-index oxide layer isolating the aperture layer (wherein the low-index oxide layer isolating the aperture layer may in some embodiments have the same or similar dimensions as other lowermost or substrate-adjacent low-index oxide layers discussed herein). A higher index material may then be deposited atop the low-index oxide layer to form a high-index region of the waveguiding layer (wherein the high-index region may have a same or similar thickness as other high-index oxide layers discussed herein). A single lithography process—that may be aligned to the features of the absorbing layer (e.g., aligned to form a fluid channel above the aperture in the aperture layer 1970)—may then be used to simultaneously define the fluid-core and solid core waveguides 1918 and 1914 in the waveguiding layer 1904.

In some embodiments, the substrate 1908 of the waveguide structure 1900 of FIG. 19 may comprise a low-index material such as a low-index oxide. In some embodiments, an aperture layer 1970 sharing one or more characteristics in common with those described with respect to FIG. 19, may be incorporated into any one or more of the other non-axial-detection waveguide structures described herein.

While the disclosure herein has discussed the use of certain oxide materials in the waveguiding layers of waveguide structures, the waveguiding layers of the structures disclosed herein may in some embodiments be formed (in whole or in part) from one or more alternate or additional materials, including but not limited to materials deposited using vapor deposition (e.g., oxide such as titanium dioxide deposited via plasma-enhanced chemical vapor deposition (PECVD) or low pressure chemical vapor deposition (LPCVD)), materials formed via thermal oxidation (e.g., silicon dioxide formed from thermal oxidation of silicon), spin-on glass, any one or more other materials that may be selected or configured for background reduction, and/or one or more plastics (e.g., polydimethylsiloxane (PDMS), cyclic olefin copolymer (COC), cyclic olefin polymer (COP)).

In some embodiments, following fabrication of a waveguide structure in accordance with any one or more of the fabrication techniques disclosed herein, one or more additional processes may be performed in order to further modify the fabricated chip, including but not limited to deposition, chemical modification, alteration of surface chemistry, and/or alteration of topology. In some embodiments, these one or more additional processes may be used to modify and/or enhance one or more properties of the fabricated structure, such as a hydrophobicity, smoothness, and/or reactivity of the fabricated structure.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of any and all patents and publications referred to in this application are hereby incorporated herein by reference.

The invention claimed is:

1. A method for fabricating a waveguide structure to form at least one solid-core waveguide, the method comprising:
   forming one or more apertures in an aperture layer of the waveguide structure;
   etching one or more fluid channels into a first oxide layer of the waveguide structure, wherein the one or more fluid channels are adjacent to the one or more apertures, and wherein the one or more apertures are configured to allow light from the one or more fluid channels to pass through the aperture layer; and
   affixing a cover layer to the first oxide layer to enclose the one or more fluid channels.

2. The method of claim 1, wherein the one or more apertures comprise a plurality of apertures in one or more aperture patterns.

3. The method of claim 2, wherein the one or more fluid channels are aligned with the one or more apertures in the aperture layer.

4. The method of claim 1, wherein the one or more apertures comprise one or more spectrally-dependent apertures.

5. The method of claim 1, wherein the one or more apertures comprise different shaped apertures.

6. The method of claim 1, further comprising:
   etching a first waveguiding air-gap and a second waveguiding air-gap into the first oxide layer, wherein etching the first and the second air-gaps creates a solid-core waveguide in the first oxide layer between the first air-gap and the second air-gap, wherein the solid-core waveguide intersects the one or more fluid channels.

7. The method of claim 6, wherein the etching of the one or more fluid channels and the etching of the first waveguiding air-gap and the second waveguiding air-gap comprises etching the one or more fluid channels, the first waveguiding air-gap and the second waveguiding air-gap at once.

8. The method of claim 1, further comprising:
   etching into a substrate layer of the waveguide structure to create an air-gap adjacent to the one or more aperture patterns, wherein the substrate layer is on a first side of the aperture layer, and wherein the first oxide layer is on a second side of the aperture layer opposite the first side.

9. The method of claim 8, wherein the substrate layer comprises one or more material selected from the group: silicon, silica, and glass.

10. The method of claim 8, further comprising:
    embedding one or more lenses in the air-gap, the one or more lenses configured for collecting light from the one or more fluid channels that passes through the one or more apertures in the aperture layer.

11. The method of claim 1, wherein the waveguide structure further comprises a second oxide layer disposed between the aperture layer and the first oxide layer.

12. The method of claim 11, wherein a thickness of the second oxide layer is greater than or equal to 1 µm.

13. The method of claim 11, wherein the waveguide structure further comprises a third oxide layer disposed between the aperture layer and the substrate layer.

14. The method of claim 13, wherein a thickness of the third oxide layer is greater than or equal to 2 µm.

15. The method of claim 13, wherein the third oxide layer comprises an optically transparent material.

16. The method of claim 13, wherein:
    the first oxide layer has a first index of refraction;
    the second oxide layer has a second index of refraction lower than the first index of refraction; and
    the third oxide layer has a third index of refraction lower than the first index of refraction.

17. The method of claim 13, wherein the second oxide layer and the third oxide layer optically isolate the aperture layer.

18. The method of claim 13, further comprising:
    depositing the third oxide layer on the substrate layer;
    depositing the aperture layer on the third oxide layer opposite the substrate layer;
    depositing the second oxide layer on the aperture layer opposite the third oxide layer
    depositing the first oxide layer on the second oxide layer opposite the aperture layer.

19. The method of claim 1, wherein forming the one or more apertures in the aperture layer comprises microfabricating the apertures via sputtering, e-beam evaporation, and/or spin coating.

20. The method of claim 1, wherein the aperture layer comprises an opaque material configured to absorb light emitted from the one or more fluid channels.

21. The method of claim 1, wherein the aperture layer comprises chrome, nickel, another metal, and/or one or more anti-resonant reflecting optical waveguide (ARROW) layers.

22. The method of claim 1, wherein a thickness of the aperture layer is equal to or less than 0.1 μm.

* * * * *